(12) United States Patent
Begley et al.

(10) Patent No.: US 8,591,146 B2
(45) Date of Patent: Nov. 26, 2013

(54) INTEGRATED PAVING SYSTEM AND METHOD

(75) Inventors: Robert W. Begley, Chambersburg, PA (US); Dale W. Starry, Jr., Shippensburg, PA (US)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 13/265,274

(22) PCT Filed: Apr. 20, 2010

(86) PCT No.: PCT/US2010/031771
§ 371 (c)(1),
(2), (4) Date: Oct. 19, 2011

(87) PCT Pub. No.: WO2010/123917
PCT Pub. Date: Oct. 28, 2010

(65) Prior Publication Data
US 2012/0051839 A1    Mar. 1, 2012

Related U.S. Application Data

(60) Provisional application No. 61/214,092, filed on Apr. 20, 2009, provisional application No. 61/214,091, filed on Apr. 20, 2009.

(51) Int. Cl.
*E01C 19/00*    (2006.01)
(52) U.S. Cl.
USPC .......... 404/108; 404/101; 404/102; 404/105; 404/118; 198/303; 198/313
(58) Field of Classification Search
CPC ...................................... E01C 19/48

USPC ............... 404/101, 102, 105, 110, 114, 118; 198/303, 312–320
See application file for complete search history.

(56) References Cited

U.S. PATENT DOCUMENTS

| | | | |
|---|---|---|---|
| 2,544,113 A | | 3/1951 | Snead |
| 3,550,511 A | * | 12/1970 | Potts ............................ 404/108 |
| 3,901,616 A | * | 8/1975 | Greening ..................... 404/102 |

(Continued)

FOREIGN PATENT DOCUMENTS

| DE | 19725612 A1 | 8/1998 |
|---|---|---|
| DE | 19800915 A1 | 7/1999 |

(Continued)

OTHER PUBLICATIONS

EPO Search Report for corresponding EP application No. 12004802.0.

(Continued)

*Primary Examiner* — Raymond W Addie
(74) *Attorney, Agent, or Firm* — Michael Pruden; Martin Farrell

(57) ABSTRACT

The present invention relates to various aspects of system and a method for forming a pavement. In one of many aspects, a portable paving mix container containing a paving mix for forming pavement is provided. The portable paving mix container is loaded onto a paving machine. The paving mix from the portable paving mix container is unloaded into a mix unloading section of the paving machine, which distributes and compacts the paving mix on a paving surface. After the unloading of the paving mix, the portable paving mix container is off loaded from the paving machine.

53 Claims, 22 Drawing Sheets

(56) References Cited

U.S. PATENT DOCUMENTS

| | | | |
|---|---|---|---|
| 4,231,695 A * | 11/1980 | Weston, Sr. | 410/69 |
| 4,395,156 A * | 7/1983 | Sprague, III | 404/110 |
| 5,080,259 A | 1/1992 | Hadley | |
| 5,580,211 A * | 12/1996 | Mengel | 414/812 |
| 6,193,437 B1 * | 2/2001 | Heims | 404/110 |
| 6,405,874 B1 | 6/2002 | Douglas | |
| 6,422,785 B1 * | 7/2002 | Ruggles et al. | 404/72 |
| 7,160,056 B1 | 1/2007 | Hoffmann et al. | |
| 7,316,522 B2 * | 1/2008 | Guntert et al. | 404/108 |
| 8,092,117 B2 * | 1/2012 | Hill et al. | 404/108 |
| 2005/0123385 A1 * | 6/2005 | Kirsch | 414/573 |
| 2005/0128080 A1 * | 6/2005 | Hall et al. | 340/539.26 |
| 2006/0045620 A1 | 3/2006 | Olson et al. | |
| 2008/0056820 A1 | 3/2008 | Hall et al. | |
| 2008/0292398 A1 | 11/2008 | Potts | |
| 2010/0111605 A1 | 5/2010 | Sturos et al. | |

FOREIGN PATENT DOCUMENTS

| | | |
|---|---|---|
| DE | 20010498 U1 | 9/2000 |
| DE | 202004004748 U1 | 6/2004 |
| GB | 806316 A | 12/1958 |
| GB | 2329631 A | 3/1999 |
| JP | 200211560 A | 8/2000 |

OTHER PUBLICATIONS

EPO Search Report for corresponding EP application No. 12004796.4.

EPO Search Report for corresponding EP application No. 12004797.2.

EPO Search Report for corresponding EP application No. 10767650.4.

* cited by examiner

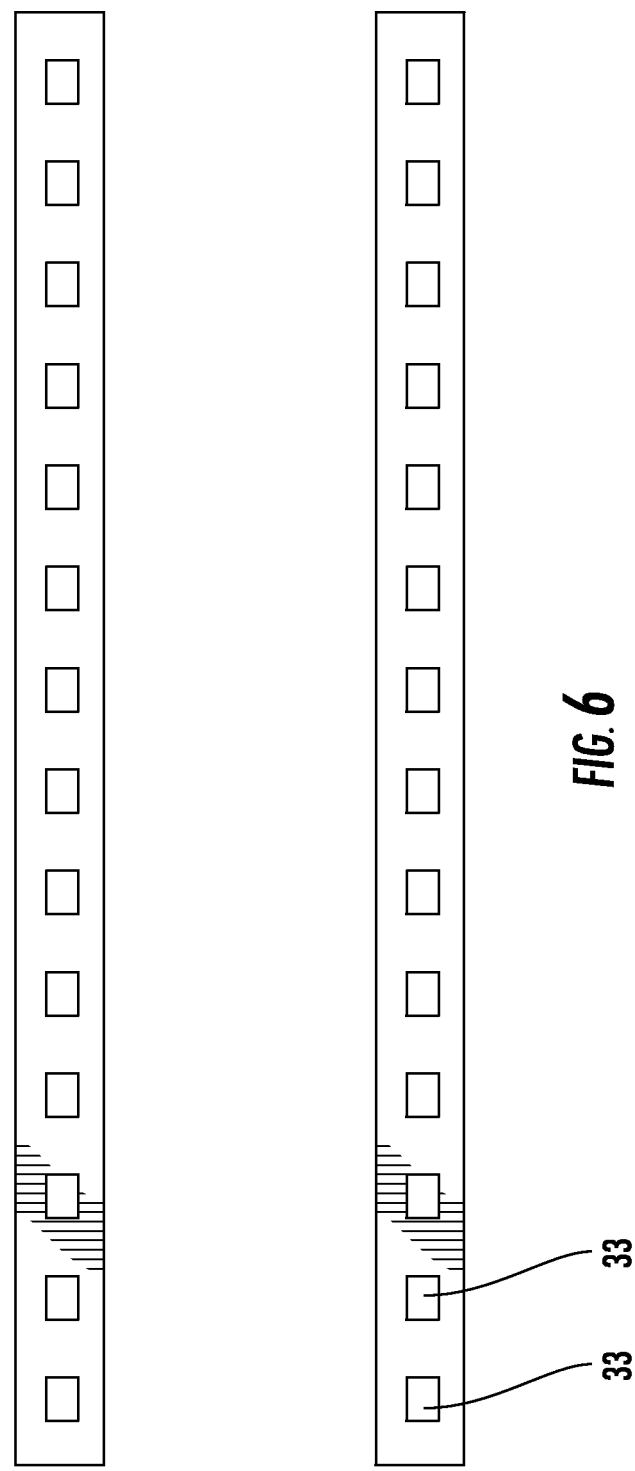

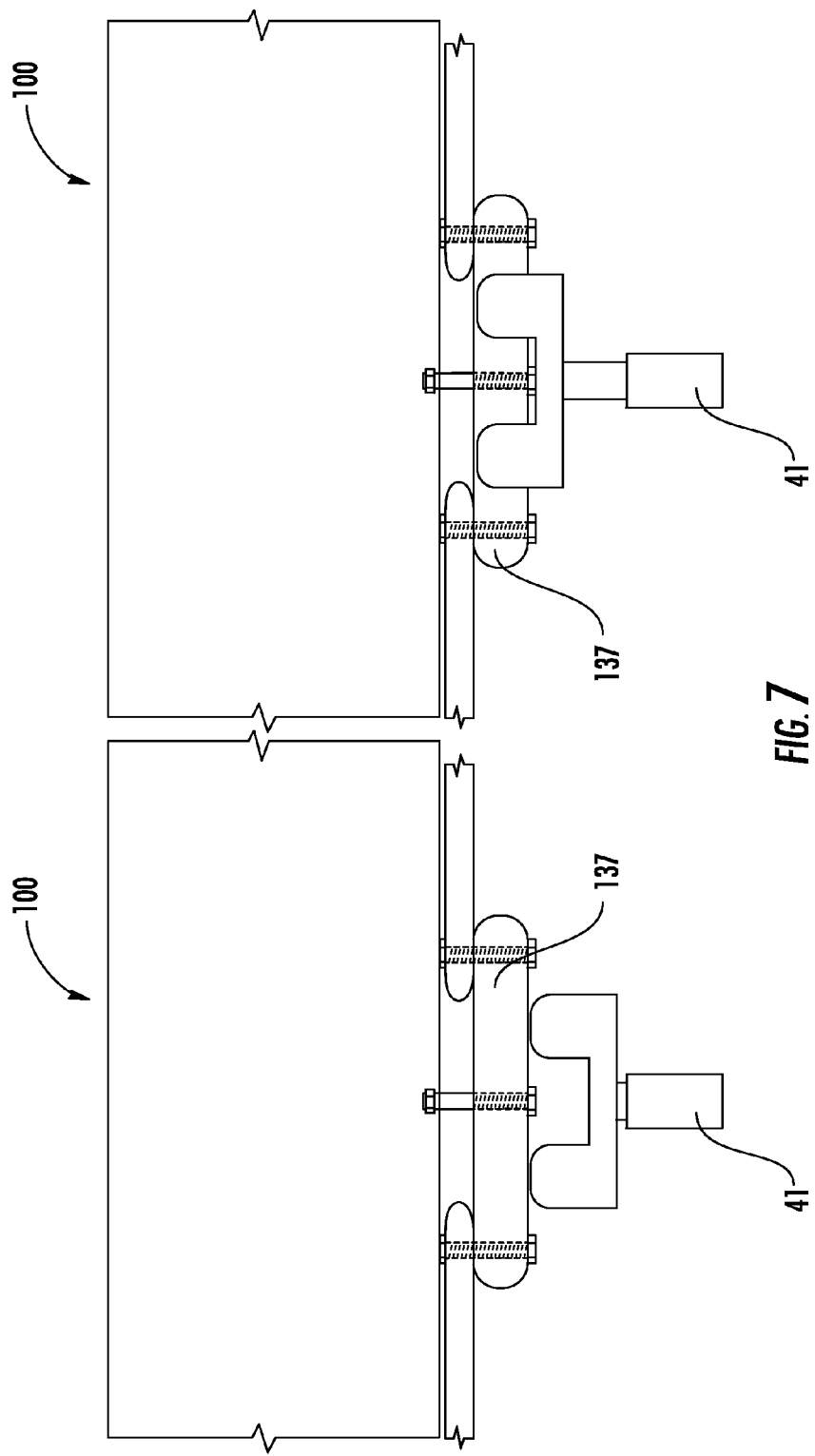

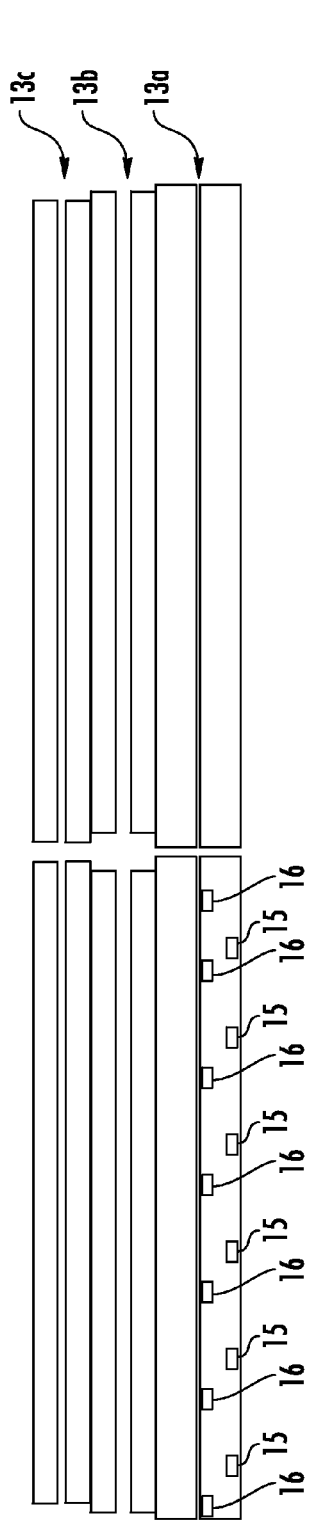
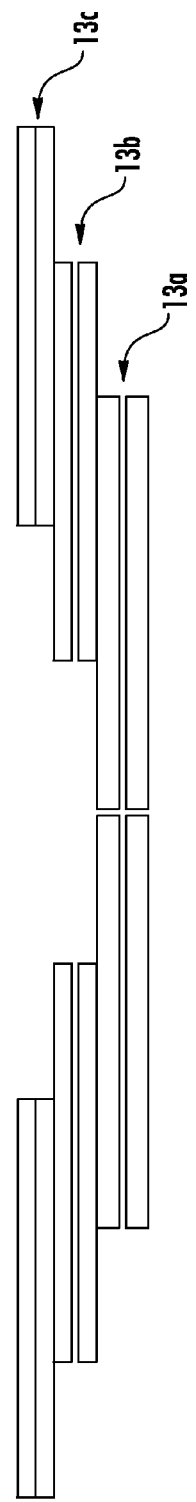
FIG. 20A
FIG. 20B

INTEGRATED PAVING SYSTEM AND METHOD

The present application claims priority to U.S. Provisional Application Nos. 61/214,091 and 61/214,092, filed Apr. 20, 2009. The disclosure of U.S. Provisional Application Nos. 61/214,091 and 61/214,092 are hereby incorporated herein by reference.

FIELD OF THE INVENTION

The present invention relates to an integrated paving system.

BACKGROUND OF THE INVENTION

In the paving art, productivity is a function of the volume of mix that can be delivered to the project and the overall speed of the lay-down and compaction process. The compaction process is typically the most limiting operation at the jobsite, while mix throughput is ordinarily less of an issue with regard to jobsite productivity. Accordingly, the number of compactors required and time available for mat densification has the greatest influence on productivity. Safety and cost are very much an issue with today's methodology, which typically employs a large number of persons to conduct the paving operation due to the fact that each machine is individually operated/controlled.

Paving operations typically employ a number of Material Transfer Vehicles or MTVs, which deliver mix to the jobsite. During transport, however, thermal loss and mechanical segregation may occur, which, in turn, adversely affects the quality of the pavement. Today, the thermal loss and mechanical segregation problems are primarily addressed in two fashions. First, thermal loss may be minimized by insulating the material haul vehicle's bed walls with foam or wood planking. Additionally, a simple canvas tarp may be draped over the open truck bed. Second, the effects of thermal varied and mechanically segregated mixes may be corrected through the use of additional, high cost auxiliary machinery to in essence "re-blend" the mix either in front of the paver (material transfer machines/windrow elevators) or in die receiving hopper of the paver (remix tub inserts).

U.S. Pat. No. 5,580,211 proposes using a double wailed insulated container for carrying hot mix asphalt and preventing thermal loss. The container effectively functions as an enclosed removable vehicle bed that is transported from an asphalt plant to the paving jobsite via a first transport vehicle. At the jobsite, the container is unloaded from the first transport vehicle and then reloaded onto a jobsite transport vehicle, which delivers the container to the paver and dumps the contents of the container into the hopper of a paver in a similar manner to a conventional asphalt transporting MTV, such as a dump truck.

The present invention is directed towards an improved integrated paving system, which may provide improvements in regard to at least one of the following: volume variability, mix containment, particle segregation, thermal losses, speed/jobsite productivity, safety, cost, or the number of persons required to conduct a paving operation.

SUMMARY OF THE INVENTION

According to one embodiment of the present invention, art improved integrated paving system includes a portable paving mix container containing a paving mix for forming pavement and a paving machine. The portable paving mix container is loaded onto the paving machine. The paving machine unloads the paving mix from the portable paving mix container. The paving machine distributes and compacts the paving mix on a paving surface.

According to another embodiment of the present invention, a method for forming a pavement comprises the steps of providing a portable paving mix container containing a paving mix for forming pavement, loading the portable paving mix container onto a paving machine, unloading the paving mix from the portable paving mix container into a mix unloading section of the paving machine, offloading the portable paving mix container from the paving machine and using the paving machine to distribute and compact the paving mix on a paving surface.

According to yet another embodiment of the present invention, a device for transporting paving mix comprises a portable enclosed paving mix container including a bottom provided with at least one door.

According to still yet another embodiment of the present invention, a device for transporting paving mix comprises a reusable collapsible portable paving mix container.

According to further embodiment of the present invention, a device for transporting paving mix comprises a collapsible portable paving mix container including a bottom provided with at least one door.

According to yet a further embodiment of the present invention, a machine for distributing and compacting paving mix on a paving surface comprises, a mix unloading section, an auger for distributing the mix on a paving surface, a screed for compacting the mix on a paving surface, a first drive arrangement that includes road wheels for self transport at highway speeds, and a second drive arrangement that includes a track assembly for jobsite transportation during a paving operation.

According to yet still a further embodiment of the present invention, a method for forming a pavement with a paving machine that includes an auger for distributing a paving mix on a paving surface and a screed for compacting the mix on the paving surface to form the pavement comprises the steps of using one or more sensors to monitor the density of the pavement as it is compacted by the screed and to provide output signals corresponding to the density and using die output signals to adjust the force exerted by the screed on the pavement as it is formed in order to achieve a desired pavement density.

ASPECTS

According to one aspect of the present invention, an integrated paving system comprises:
 a portable paving mix container containing a paving mix for forming pavement;
 a paving machine, wherein:
  the portable paving mix container is loaded onto the paving machine;
  the paving machine unloads the paving mix from the portable paving mix container; and
  the paving machine distributes and compacts the paving mix on a paving surface.

Preferably, the paving machine opens at least one door on the portable paving mix container in order to unload the paving mix from the container.

Preferably, the paving machine further comprises one or more conveyor sections that receive the portable paving mix container as the portable paving mix container is loaded onto the paving machine and that unload the portable paving mix container off the paving machine and a mix unloading section whereat paving mix from the portable container is unloaded.

Preferably, the one or snore conveyor sections include a container loading conveyor section that receives the portable paving mix container as it is loaded onto the paving machine and a container offloading conveyor section that offloads the portable paving mix container from the paving machine.

Preferably, the one or more conveyor sections include a container loading conveyor section that receives the portable paving mix container as it is loaded onto the paving machine and a container offloading conveyor section that offloads the portable paving mix container from the paving machine and the mix unloading section is located between the container loading conveyor section and the container offloading conveyor section.

Preferably, the one or more conveyor sections include a container loading conveyor section that receives the portable paving mix container as it is loaded onto the paving machine and a container offloading conveyor section that offloads the portable paving mix container from the paving machine, the mix unloading section is located between the container loading conveyor section and the container offloading conveyor section, the container loading conveyor section transports the portable paving mix container to the mix unloading section, and the mix unloading section transports the portable paving mix container to the container off loading section.

Preferably, the paving machine includes a first drive arrangement that includes road wheels for self transport at highway speeds and a second drive arrangement that includes a track assembly for jobsite transportation during a paving operation.

Preferably, the paving machine includes an auger for distributing the mix on a paving surface, a screed for compacting the mix on a paving surface, a first drive arrangement that includes road-wheels for self transport at highway speeds, a second drive arrangement that includes a track assembly for jobsite transportation during a paving operation and the track assembly, screed, and auger are lowered to place the track assembly in contact with a ground surface and to position the screed and auger at a proper height for a paving operation.

Preferably, the paving machine includes an auger for distributing foe mix on a paving surface, a screed for compacting the mix on a paving surface, a first drive arrangement that includes road wheels for self transport at highway speeds, a second drive arrangement that includes a track assembly for jobsite transportation during a paving operation and the track assembly, the screed, and the auger are simultaneously lowered into position to place the track assembly in contact with a ground surface and to position the screed and auger at a proper height for a paving operation.

Preferably, the paving machine self loads the portable paving mix container onto the paving machine.

Preferably, the paving machine self offloads the portable paving mix container from the paving machine.

Preferably, the one or more conveyor sections self loads the portable paving mix container onto the paving machine.

Preferably, the one or snore conveyor sections includes a belt or chain drive that self loads the portable paving mix container onto the paving machine.

Preferably, the one or more conveyor sections includes a belt or chain drive that self offloads the portable paving mix container from the paving machine.

Preferably, the container loading conveyor section is ramped so that it inclines upwards from a ground surface and is positionable under the portable paving mix container for self loading the portable paving mix container onto the paving machine.

Preferably, the container offloading conveyor section is ramped so that it declines downward from the paving machine to a ground surface and self unloads the portable paving mix container from the paving machine.

Preferably, one or more doors are provided on a bottom of the portable paving mix container, wherein the one or more doors are opened to unload the mix.

Preferably, the portable paving mix container is provided with a collapsed configuration and an expanded configuration.

Preferably, the portable paving mix container includes a radio frequency identification chip.

Preferably, the portable paving mix container includes a gps tracking device.

Preferably, the integrated paving system further includes another portable paving mix container, wherein the paving machine is loaded with the portable paving mix container and the another portable paving mix container simultaneously.

Preferably, the integrated paving system further includes another portable paving mix container wherein the portable paving mix container is located on the container loading conveyor section and the another portable paving mix container is located on the mix unloading section.

According to another aspect of the present invention, a method for forming a pavement comprises the steps of:
  providing a portable paving mix container containing a paving mix for forming pavement;
  loading the portable paving mix container onto a paving machine;
  unloading the paving mix from the portable paving mix container into a mix unloading section of the paving machine;
  offloading the portable paving mix container from the paving machine; and
  using the paving machine to distribute and compact the paving mix on a paving surface.

Preferably, the step of unloading the paving mix from the portable paving mix container includes the step of using the paving machine to open at least one door on the portable paving mix container in order to release the paving mix from the container.

Preferably, the paving machine further comprises one or more conveyor sections that receive the portable paving mix container as the portable paving mix container is loaded onto the paving machine and that offload the portable paving mix container off the paving machine.

Preferably, the one or more conveyor sections include a container loading conveyor section that receives the portable paving mix container as it is loaded onto the paving machine and a container offloading conveyor section that offloads the portable paving mix container from the paving machine.

Preferably, the one or more conveyor sections include a container loading conveyor section that receives the portable paving mix container as it is loaded onto the paving machine and a container offloading conveyor section that offloads the portable paving mix container from the paving machine and the mix unloading section is located between the container loading conveyor section and the container offloading conveyor section.

Preferably, the one or more conveyor sections include a container loading conveyor section that receives the portable paving mix container as it is loaded onto the paving machine and a container offloading conveyor section that offloads the portable paving mix container from the paving machine, the mix unloading section is located between the container loading conveyor section and the container offloading conveyor section, and the method further comprising the steps of using the container loading conveyor section to transport the portable paving mix container to the mix unloading section and using the mix unloading section to transport the portable paving mix container to the container off loading section.

Preferably the method further comprises the step of using a first drive arrangement that includes road wheels for self transport of the paving machine at highway speeds and a second drive arrangement that includes a track assembly for jobsite transportation of the paving machine during a paving operation.

Preferably, the paving machine includes an auger for distributing the mix on a paving surface, a screed for compacting the mix on a paving surface, a first drive arrangement that includes road wheels for self transport at highway speeds, a second drive arrangement that includes a track assembly for jobsite transportation during a paving operation and the method further comprises the step of subsequent to self transport at highway speeds, lowering the track assembly, screed, and auger to place the track assembly in contact with a ground surface and to position the screed and auger at a proper height for a paving operation.

Preferably, the paving machine includes an auger for distributing the mix on a paving surface, a screed for compacting the mix on a paving surface, a first drive arrangement that includes road wheels for self transport at highway speeds, a second drive arrangement that includes a track assembly for jobsite transportation during a paving operation and the method further comprises foe step of subsequent to self transport at highway speeds simultaneously lowering the track assembly, the screed, and the auger to place the track assembly in contact with a ground surface and to position the screed and auger at a proper height for a paving operation.

Preferably, the step of loading the portable paving mix container onto the paving machine comprises the step of using the paving machine to self load the portable paving mix container onto the paving machine.

Preferably, the step of offloading the portable paving mix container from the paving machine comprises the step of using the paving machine to self offload the portable paving mix container from the paving machine.

Preferably, the step of loading the portable paving mix container onto the paving machine comprises the step of using the one or more conveyor sections to self load the portable paving mix container onto the paving machine.

Preferably, the one or more conveyor sections includes a belt or chain drive; and the step of loading the portable paving mix container onto the paving machine comprises the step of using the belt or chain drive to self load the portable paving mix container onto the paving machine.

Preferably, the one or more conveyor sections includes a belt or chain drive that self offloads the portable paving mix container from the paving machine.

Preferably, the container loading conveyor section is ramped so that it inclines upwards from a ground surface and the step of loading the portable paving mix container onto the paving machine comprises the step of positioning the container loading conveyor section under the portable paving mix container and using the container loading conveyor section to self load the portable paving mix container onto the paving machine.

Preferably, the container offloading conveyor section is ramped so that it declines downward from the paving machine to a ground surface and the step of offloading the portable paving mix container comprises the step of using the container offloading conveyor section to self offload the portable paving mix container from the paving machine.

Preferably, one or more doors are provided on a bottom of the portable paving mix container and the step of unloading foe paving mix from the portable paving mix container includes the step of using the paving machine to open the one or more doors in order to release the paving mix from foe container.

Preferably, the portable paving mix container is provided with a collapsed configuration and an expanded configuration and the method further comprises the step of using the paving machine to collapse the portable paving mix container.

Preferably, the portable paving mix container includes a radio frequency identification chip.

Preferably, the portable paving mix container includes a gps tracking device.

Preferably, the method further comprises the step of loading the paving machine with the portable paving mix container and the another portable paving mix container simultaneously.

Preferably, the step of loading the portable paving mix container onto the paving machine includes the step of loading the portable paving mix container on the container loading conveyor section while another portable paving mix container is located on the mix unloading section.

Preferably, the step of unloading the paving mix from the portable paving mix container into a mix unloading section of the paving machine includes tire step of using the paving machine to unload the paving mix from the portable paving mix container.

Preferably, the step of placing a plurality of the portable paving mix containers on the paving surface at spaced intervals, wherein the spaced intervals are dimensioned according to an amount of pavement formed by the paving mix of the portable paving mix containers, the step of loading the portable paving mix container onto the paving machine includes the step of using the paving machine to self load the portable paving mix containers onto the paving machine, and the step of offloading the portable paving mix container from the paving machine includes the step of using the paving machine to self offload the portable paving mix containers from the paving machine.

Preferably, the step of placing a plurality of the portable paving mix containers on the paving surface at spaced intervals, wherein the spaced intervals are dimensioned to correspond to an amount pavement formed by the paving mix of the portable paving mix containers, the step of loading the portable paving mix container onto the paving machine includes the step of using the paving machine to self load the portable paving mix containers onto the paving machine, and the step of offloading the portable paving mix container from the paving machine includes the step of using the paving machine to self offload the portable paving mix containers from the paving machine.

Preferably, the step of placing a plurality of the portable paving mix containers on the paving surface at spaced intervals, wherein the spaced intervals are dimensioned according to an amount of pavement formed by the paving mix of the portable paving mix containers, the paving machine includes a container loading conveyor section provided with a plurality of protrusions or depressions that mate with a plurality of respective depressions or protrusions on a bottom of the plurality of portable paving mix containers for purposes of self loading the portable paving mix containers onto the paving machine, and the step of offloading the portable paving mix container from the paving machine includes the step of using the paving machine to self offload the portable paving mix containers from the paving machine.

Preferably, the step of placing a plurality of the portable paving mix containers on the paving surface at spaced intervals, wherein the spaced intervals are dimensioned to correspond to an amount pavement formed by the paving mix of the portable paving mix containers, the paving machine includes a container loading conveyor section provided with a plurality of protrusions or depressions that mate with a plurality of respective depressions or protrusions on a bottom of the plurality of portable paving mix containers for purposes of self loading the portable paving mix containers onto the paving machine, and the step of offloading the portable paving mix container from the paving machine includes the step of using the paving machine to self offload the portable paving mix containers from the paving machine.

According to another aspect of the present invention, a device for transporting paving mix comprises a portable enclosed paving mix container including a bottom provided with at least one door.

Preferably, the portable enclosed paving mix container includes 6 walls and is provided with a generally box shape.

Preferably, the portable enclosed paving mix container is insulated.

Preferably, a bottom of the portable enclosed paving mix container includes a chamfered edge.

Preferably, the bottom includes a plurality of protrusions that support a collapsible portable paving mix container.

Preferably, the bottom of the portable enclosed paving mix container includes a plurality of protrusions that extend linearly along opposing edges of the bottom and that support the collapsible portable paving mix container.

Preferably, the bottom of the portable enclosed paving mix container includes a plurality of depressions.

Preferably, the bottom of the portable enclosed paving mix container includes a plurality of depressions that extend linearly along opposing edges of the bottom.

Preferably, the portable paving mix container includes a radio frequency identification chip.

Preferably, the portable paving mix container includes a gps tracking device.

Preferably, an interior of the portable paving mix container includes a sloped paving mix diversion that diverts paving material to the at least one door.

According to another aspect of the present invention, a device for transporting paving mix comprises a reusable collapsible portable paving mix container.

Preferably, the reusable collapsible portable paving mix container includes 6 walls and is provided with a generally box shape.

Preferably, the reusable collapsible portable paving mix container is insulated.

Preferably, the reusable collapsible portable paving mix container includes two end caps and a center section that are telescopically connected.

Preferably, a bottom of the reusable collapsible portable paving mix container includes a chamfered edge.

Preferably, a bottom of the reusable collapsible portable paving mix container includes a plurality of protrusions that support a reusable collapsible portable paving mix container.

Preferably, a bottom of the reusable collapsible portable paving mix container includes a plurality of protrusions that extend linearly along opposing edges of the bottom and that support the reusable collapsible portable paving mix container.

Preferably, a bottom of the reusable collapsible portable paving mix container includes a plurality of depressions.

Preferably, a bottom of the reusable collapsible portable paving mix container includes a plurality of depressions that extend linearly along opposing edges of the bottom.

Preferably, the reusable collapsible portable paving mix container includes a radio frequency identification chip.

Preferably, the reusable collapsible portable paving mix container includes a gps tracking device.

According to another aspect of the present invention, a device for transporting paving mix comprises a collapsible portable paving mix container including a bottom provided with at least one door.

Preferably, the collapsible portable paving mix container includes 6 walls and is provided with a generally box shape.

Preferably, the collapsible portable paving mix container is insulated.

Preferably, the collapsible portable paving mix container includes two end caps and a center section that are telescopically connected.

Preferably, the collapsible portable paving mix container includes two end caps and a center section that are telescopically connected and the at least one door is provided in at least one of the end caps.

Preferably, the bottom of the collapsible portable paving mix container includes a chamfered edge.

Preferably, the bottom of the collapsible portable paving mix container includes a plurality of protrusions that support a collapsible portable paving mix container.

Preferably, the bottom of the collapsible portable paving mix container includes a plurality of protrusions that extend linearly along opposing edges of the bottom and that support the collapsible portable paving mix container.

Preferably, the bottom of the collapsible portable paving mix container includes a plurality of depressions.

Preferably, the bottom of the collapsible portable paving mix container includes a plurality of depressions that extend linearly along opposing edges of the bottom.

Preferably, the collapsible portable paving mix container includes a radio frequency identification chip.

Preferably, the collapsible portable paving mix container includes a gps tracking device.

Preferably, an interior of the portable paving mix container includes a sloped paving mix diversion that diverts paving material to the at least one door.

According to another aspect of the present invention, a machine for distributing and compacting paving mix on a paving surface comprises:
  a mix unloading section;
  an auger for distributing the mix on a paving surface;
  a screed for compacting the mix on a paving surface;
  a first drive arrangement that includes road wheels for self transport at highway speeds; and
  a second drive arrangement that includes a track assembly for jobsite transportation during a paving operation.

Preferably, the track assembly, screed, and auger are provided with a first position and a second position, wherein the first position is elevated relative to the second position and the track assembly, screed, and auger are lowered into the second position to place the track assembly in contact with a ground surface and to position the screed and auger at a proper height for a paving operation.

Preferably, the machine further comprises an operator's control interface that is positioned towards the front of the paving machine during self transport at highway speeds and towards the rear of the paving machine for jobsite transport during a paving operation.

According to another aspect of the present invention, a method for forming a pavement with a paving machine that includes an auger for distributing a paving mix on a paving surface and a screed for compacting the mix on the paving surface to form the pavement, comprising the steps of:

using one or more sensors to monitor the density of the pavement as it is compacted by the screed and to provide output signals corresponding to the density; and using the output signals to adjust the force exerted by the screed on the pavement as it is formed in order to achieve a desired pavement density.

Preferably, the paving machine further comprises one or more electronics that receive the output signals and automatically adjust the force exerted by the screed.

Preferably, the paving machine further comprises a display that shows the density readings.

BRIEF DESCRIPTION OF THE DRAWINGS

FIG. 6 is a top view showing a belt or chain drive provided on the front ramped container loading conveyor section and the rear ramped container offloading conveyor section in one embodiment.

FIG. 7 shows a door opening mechanism on one embodiment of the paving machine.

FIGS. 20A and 20B shows a screed according to one embodiment of the present invention.

DETAILED DESCRIPTION OF THE INVENTION

FIGS. 1-6 and 8 show a paving machine 10 according to one embodiment. Those of ordinary skill in the art will appreciate that the paving machine 10 is configured to lay down paving mix, including, for example, and not limitation, asphalt or concrete.

According to one aspect of the present embodiment, the paving machine 10 includes at least one drive arrangement that is used to propel the paving machine 10. According to another aspect of the present embodiment, the paving machine 10 may be configured for both over the road self transport at highway speeds, i.e. speeds of at least 45 mph and as well as jobsite transport during a paving operation, i.e. at speeds of less than or equal to 10 mph. According to yet another aspect of the present embodiment, the paving machine 10 may be equipped with two independent drive arrangements 15 and 20.

As shown in FIGS. 1-6 and 8, the first drive arrangement may include road wheels 15 for over the road self transport at highway speeds. Also shown in FIGS. 1-6 and 8, the second drive arrangement may include a track assembly 20 for jobsite transport as the paving machine 10 lays down paving material.

Figure 2A:
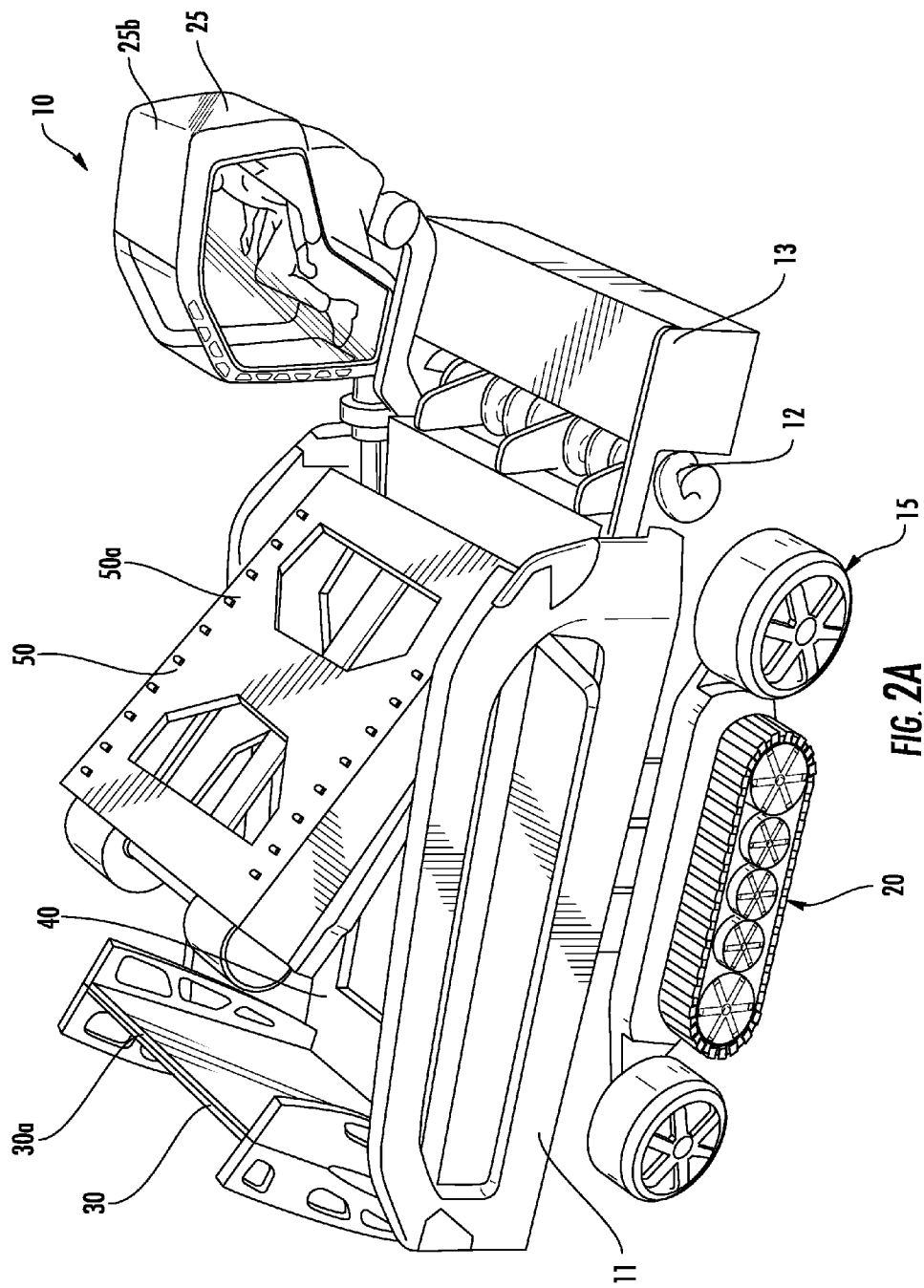
FIGS. 2A-2C shows the paving machine according to one embodiment in three views lowering the track assembly to convert for a paving operation.
Figure 2B:
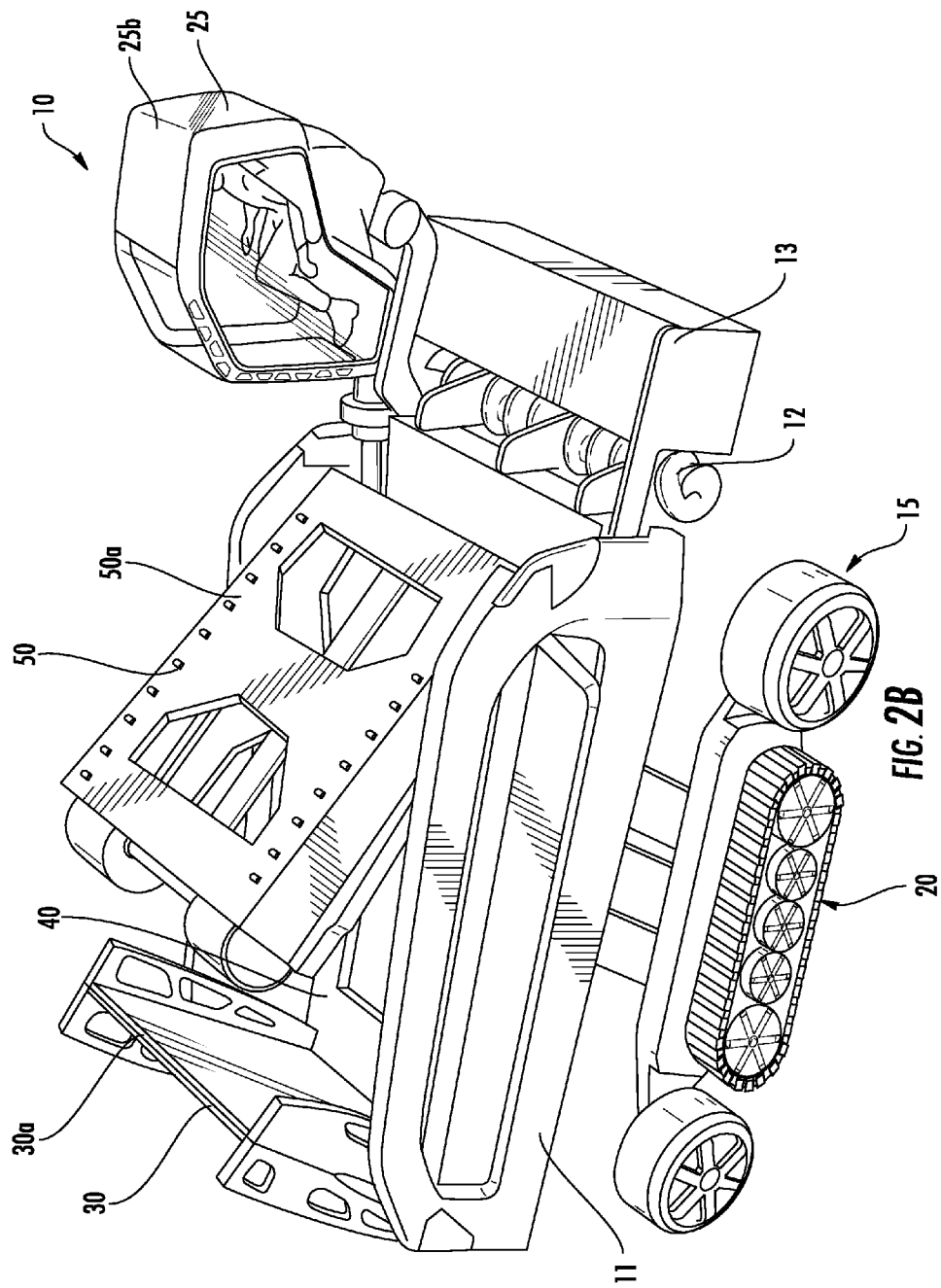
Figure 2C:
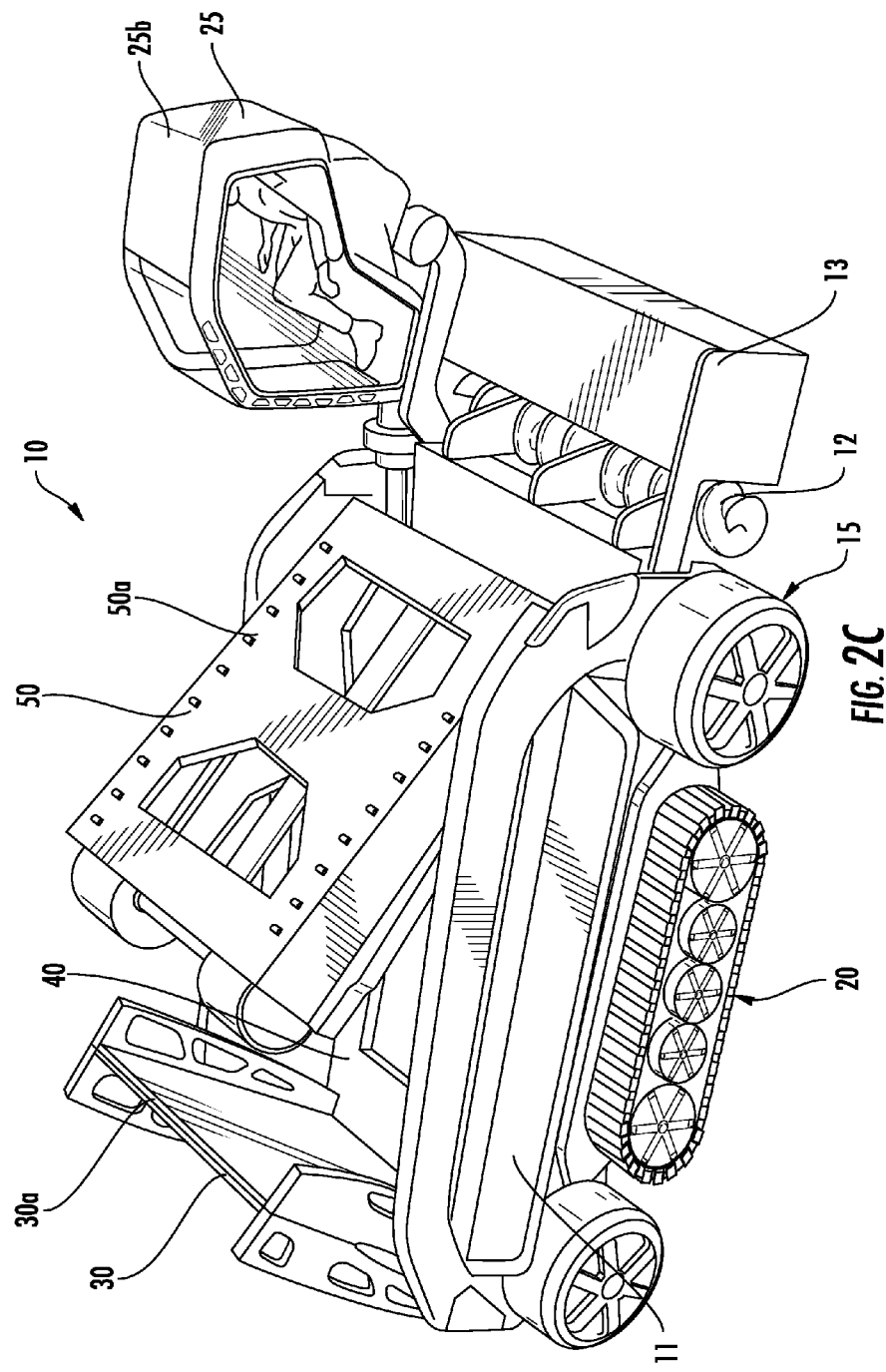

As shown in FIG. 2A-2C, the track assembly 20 may be vertically retracted and lifted off the ground surface during over the road self transport, at highway speeds. Once the paving machine 20 is transported to the jobsite, the track assembly 20 may be extended and lowered to place the track assembly 20 in contact with the ground surface. In one arrangement, both the track assembly 20 and the paving machine body 11, including the screed 13 and auger 12, may be lowered via a common mechanism to place track assembly 20 in contact with the ground surface and to position the screed 13 and auger 12 at the proper height for a paving operation. In another arrangement, the track assembly 20 may be lowered independently of the body, the screed 13, and/or the auger 12. In such an arrangement the screed 13 and auger 12 may be lowered independently or may be positioned at the proper height for a paving operation once the track assembly contacts the ground surface and the road wheels 15 are lifted off the ground.

Also shown in FIGS. 2A-2C, the road wheels 15 contact the ground surface during over the road self transport. Those of ordinary skill in the art will appreciate that the lowering of the track assembly 20 for on the job transport may also lift the road wheels 15 off the ground during on the job transport. Alternatively, however, those of ordinary skill in the art will appreciate that the road wheels 15 and the track assembly 20 may both remain in contact with the ground surface during on the job transport. Those of ordinary skill in the art will appreciate that a variety of methods may be employed for purposes of retracting and extending the track assembly, including, but not limited to a motor drive, worm gear, step motor, pneumatic, and hydraulic mechanisms.

Figure 1:
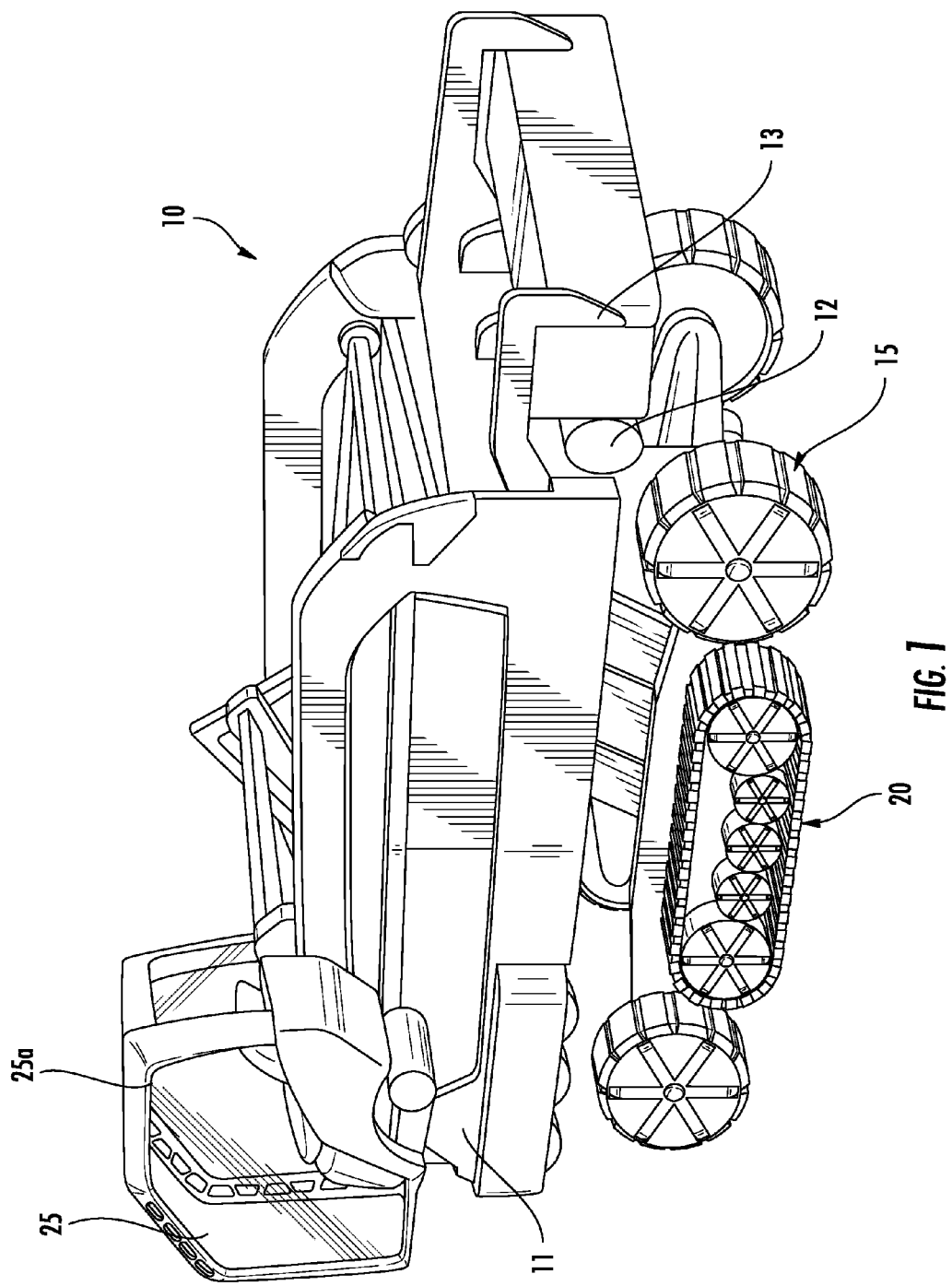
FIG. 1 shows a paving machine according to one embodiment configured for self transport at highway speeds with the road wheels down and the track vertically retracted.

According to yet another aspect of the present embodiment, the operator's control interface 25, which may be located in an enclosed or partially enclosed cabin, may have first and second positions 25a, 25b depending on whether the paving machine 10 is undergoing over the road self transport at highway speeds or on the jobsite transport during a paving operation. As shown in FIG. 1, during over the road self transport mode; the operator's control interface 25 may be positioned in the first position 25a, which may be at or towards the front of the paving machine 10. As shown in FIG. 2A-2C, when the paving machine 10 is on the paving jobsite performing a paving operation, the control interlace may be positioned in the second position 25b, which may be at the rear of the paving machine 10 or closer towards the rear of the paving machine 10 than the first position 25a. As shown by a comparison of FIG. 1 to FIGS. 2A-2C, the operator's control interface may be located at either the left or right side of the paving machine 10. In addition to the first and second positions 25a, 25b shown, any number of additional positions with differing heights and aspect views may be provided and any number of arrangements may be employed for purposes of moving the control interface 25 between the positions. By way of example, and not limitation, the control interface 25 may be mounted on a rail or some other mechanism and a motor drive, worm gear, step motor, pneumatic, or hydraulic mechanism may be used, to adjust the positions.

As shown in FIG. 2A-4, the paving machine 10 is provided with a container loading conveyor section 30, a mix unloading section 40, and a container offloading conveyor section 50. As shown, the mix unloading section 40 is located between the container loading conveyor section 30 and the container offloading conveyor section 50. Also shown the container loading conveyor section 30 is located at the front of the paving machine 10 and the container offloading conveyor section 50 is located at the rear of the paving machine 10.

Figure 4:
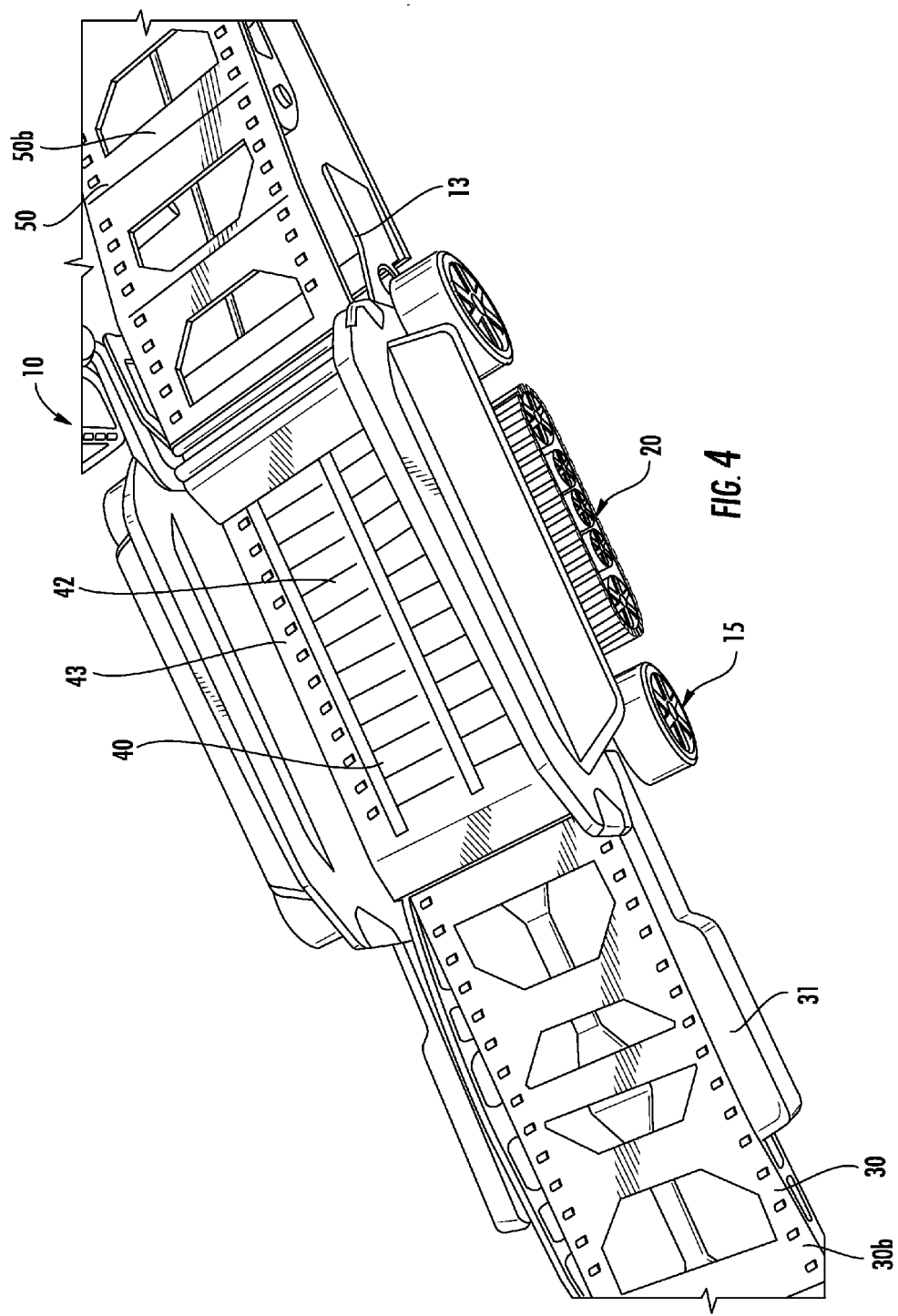
FIG. 4 is a top view of the paving machine according to one embodiment configured for a paving operation showing the front ramped container loading conveyor section (left) and rear ramped container offloading conveyor section (right side) in deployed positions.

According to one aspect of the present embodiment, the container loading conveyor section 30 may have a stowed position 30a and a deployed position 30b. According to another aspect of the present embodiment, the container offloading conveyor section 50 may have a stowed position 50a and a deployed position 50b. Turning now to FIGS. 2A-2C, the stowed positions 30a, 50a of the respective container loading conveyor section 30 and the container offloading conveyor section 50 are shown. Turning now to FIG. 4, the deployed positions 30b, 50a of the respective container loading conveyor section 30 and the container offloading conveyor section 50 are shown.

Figure 3:
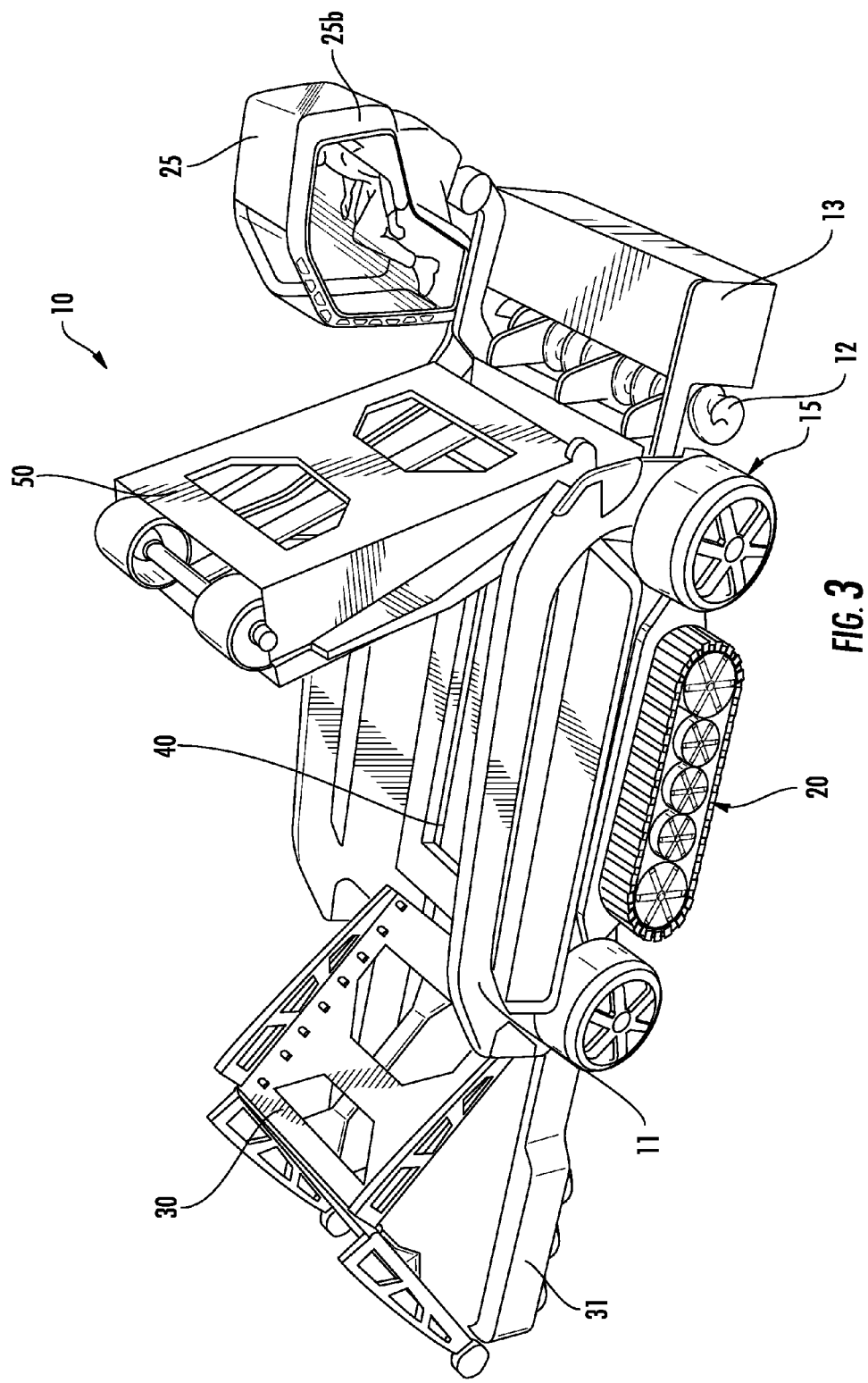
FIG. 3 shows the paving machine according to one embodiment deploying a container loading conveyor section support (left side of the figure in front of the wheels) and unfolding the front ramped container loading conveyor section (left) and rear ramped container offloading conveyor section (right side).

As shown in FIGS. 3 and 4, as the container loading conveyor section 30 and the container offloading conveyor section 50 transition from the stowed positions 30a, 50a to the deployed positions 30b, 50b, the container loading conveyor section 30 and the container offloading conveyor section 50 are unfolded to extend outwards in opposite directions from the mix unloading section 40. As shown in FIG. 3 a container loading conveyor section support 31, which supports the container loading conveyor section 30 while deployed, may also be extended horizontally from the paving machine 10 during the transition. The screed 13 may also function as support for the container offloading conveyor section 50.

As shown in FIGS. 2A-2C and 3 as the container loading conveyor section 30 and the container offloading conveyor section 50 transition to the stowed positions 30a, 50a from the deployed positions 30b, 50b, the container loading conveyor section 30 and the container offloading conveyor section 50 are folded inwards, for example, and not limitation, whereby they are positioned over the mix unloading section 40, whereby the paving machine 10 is compacted and the overall length of the paving machine 10 is reduced relative to the deployed positions 30b, 50b. Advantageously, during over the road transport at highway speeds, the container loading conveyor section 30 and the container offloading conveyor section 50 may be folded into the stowed positions 30a, 50a in order to facilitate over the road transport at highway speeds. Likewise, during on the jobsite transport during a paving operation, the container loading conveyor section 30 and the container offloading conveyor section 50 may be folded into the deployed positions 30a, 50a in order to facilitate loading and unloading of portable paving mix containers, as hereinafter discussed. Those of ordinary skill in the art will appreciate that a variety of hydraulic or pneumatic systems may be employed for purposes of transitioning between the stowed and deployed positions.

According to one aspect of the present embodiment, the paving machine 10 is configured to receive a portable paving mix container, such as, for example, and not limitation, portable paving mix container 100 shown in FIGS. 5-8. According to another aspect of the present embodiment, the container loading convey section 30 is configured to receive a portable paving mix container as it is loaded onto foe paving machine 10.

The form of loading the portable paving mix container onto the container loading conveyor section may take a variety of forms, in one arrangement, a vehicle, such as, for example, a fork lift or mini crane, may offload portable paving mix containers 100 directly onto the container loading conveyor section 30. In another arrangement the paving machine 10 may self load the portable paving mix containers. By way of example, the paving machine may be outfitted with a mini crane or elevator.

Figure 5:
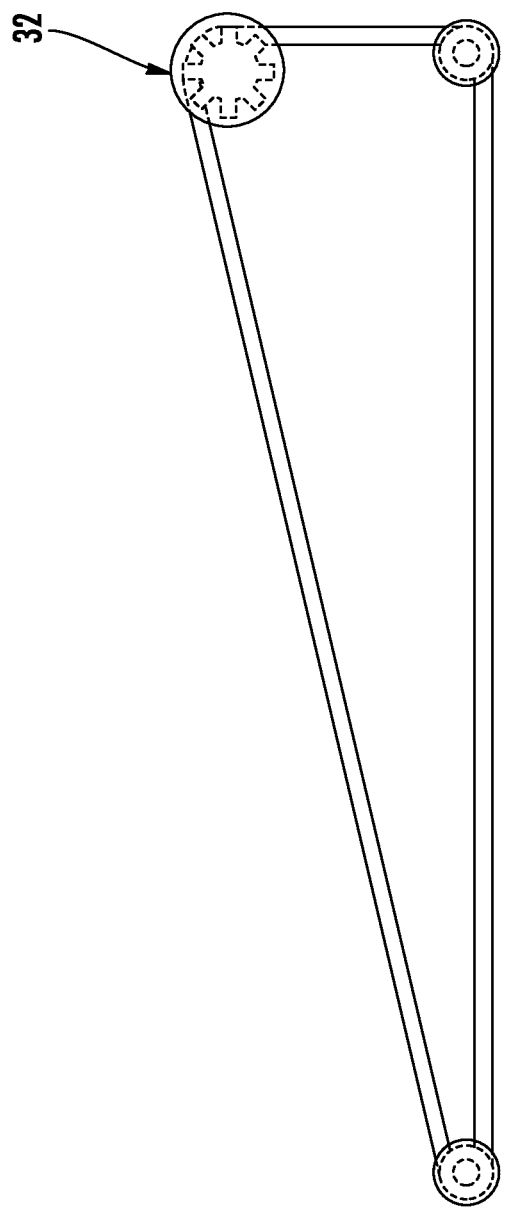
FIG. 5 is a side view showing a belt or chain drive provided on the front ramped container loading conveyor section and the rear ramped container offloading conveyor section in one embodiment.
Figure 10:
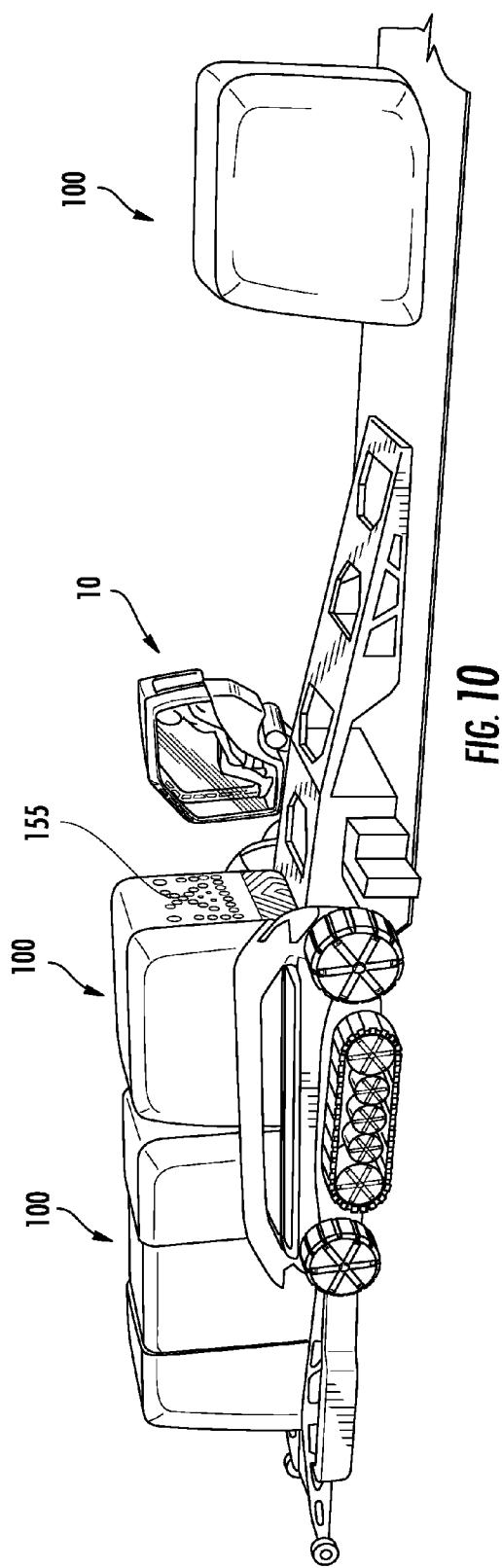
FIG. 10 shows one embodiment of the paving machine loading, unloading, and offloading the portable paving mix containers.
Figure 11:
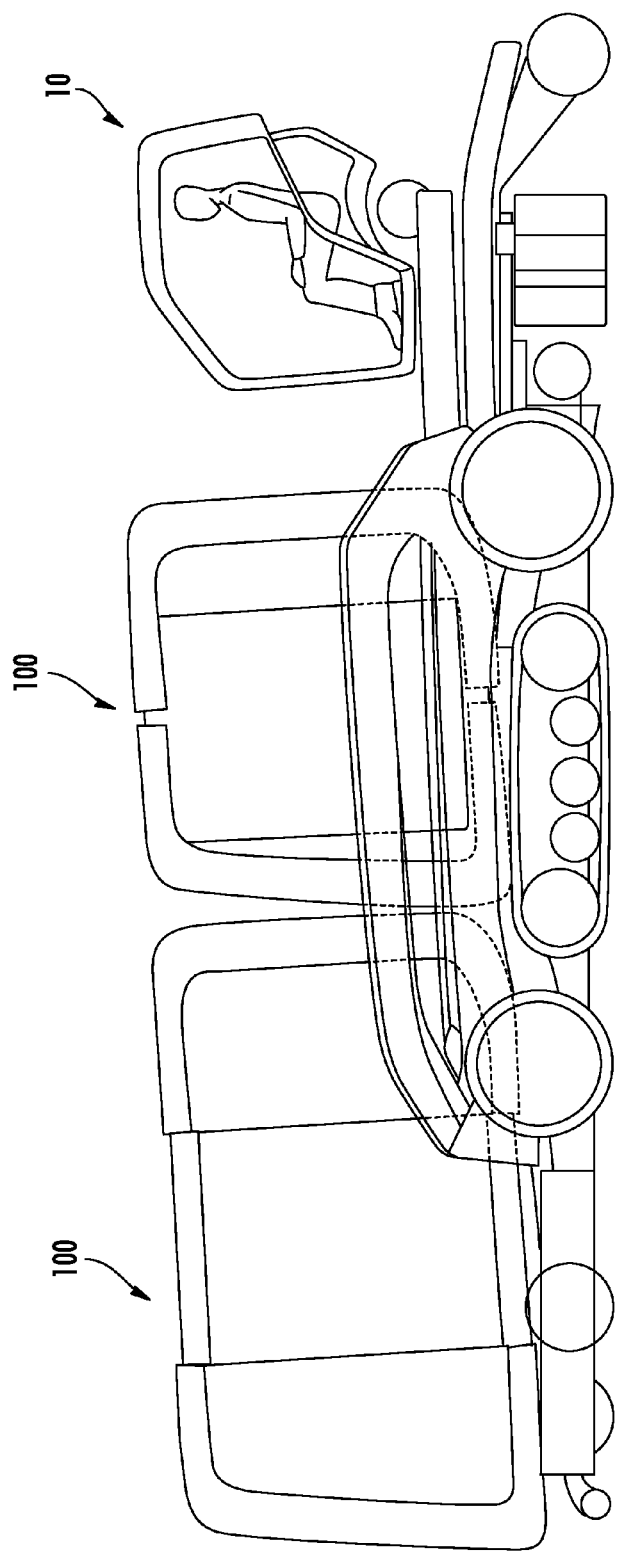
FIG. 11 shows one embodiment of the paving machine loading a portable paving mix container and unloading paving mix from another portable paving mix container.

As shown in FIG. 4, in the preferred embodiment, the container loading conveyor section 30 is configured to self load the portable paving mix containers onto the paving machine. As shown, in FIGS. 4 and 10, when the container loading conveyor section 30 is deployed it is preferably ramped so that it inclines upwards from a ground surface. As shown in FIGS. 4-6, the container loading conveyor section 30 may also include a belt or chain drive 32 that self loads the portable paving mix container onto the paving machine 10. As shown best in FIG. 6, the belt or chain drive 32 may include a plurality of protrusions or depressions 33 that mate with respective protrusions or depressions 133 on a bottom 100a of the portable paving mix containers 100 during self loading. Also shown, the bottom 100a of the portable paving mix containers 100 may be provided with a chamfered edge 131 that assists self loading.

Advantageously, during self loading, the container loading conveyor section 30 may be slid or positioned raider the chamfered edge 131 and under foe bottom 100a of the portable paving mix containers 100 until the depressions or protrusions 33 on the belt or chain drive 32 mate with the depressions or protrusions 33 on the bottom 100a of the portable paving mix container. Thereafter, the belt or chain drive 32 may pull the portable paving mix containers 100 up the ramped container loading conveyor section 30 and onto the paving machine. In a similar manner, the container loading conveyor section 30 may transport the portable paving mix container 100 to the mix unloading section 40 of the paving machine 10.

According to one aspect of the present embodiment, the paving machine 10 is configured to unload the mix from the portable paving mix container. According to another aspect of the present embodiment the paving machine 10 is configured to unload the mix from the portable paving mix container into the mix unloading section 40. The form of unloading the paving mix from the portable paving mix container may take a variety of forms within the scope of the present invention. By way of example, and not limitation, the portable paving mix container may be tilted or dumped to unload the paving mix into the mix unloading section 40.

Figure 14:
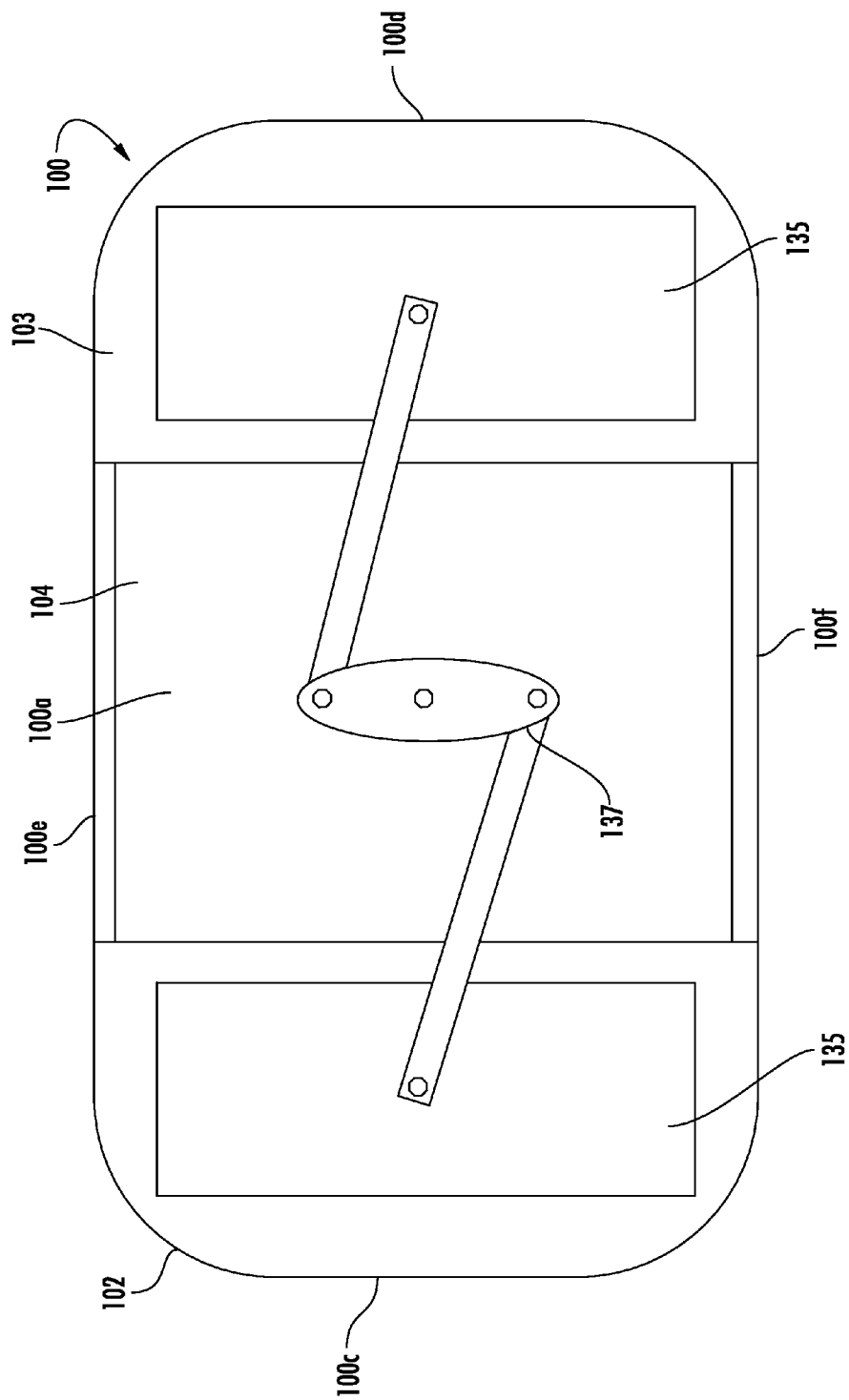
FIG. 14 shows a bottom of a portable paving mix container according to one embodiment.
Figure 15:
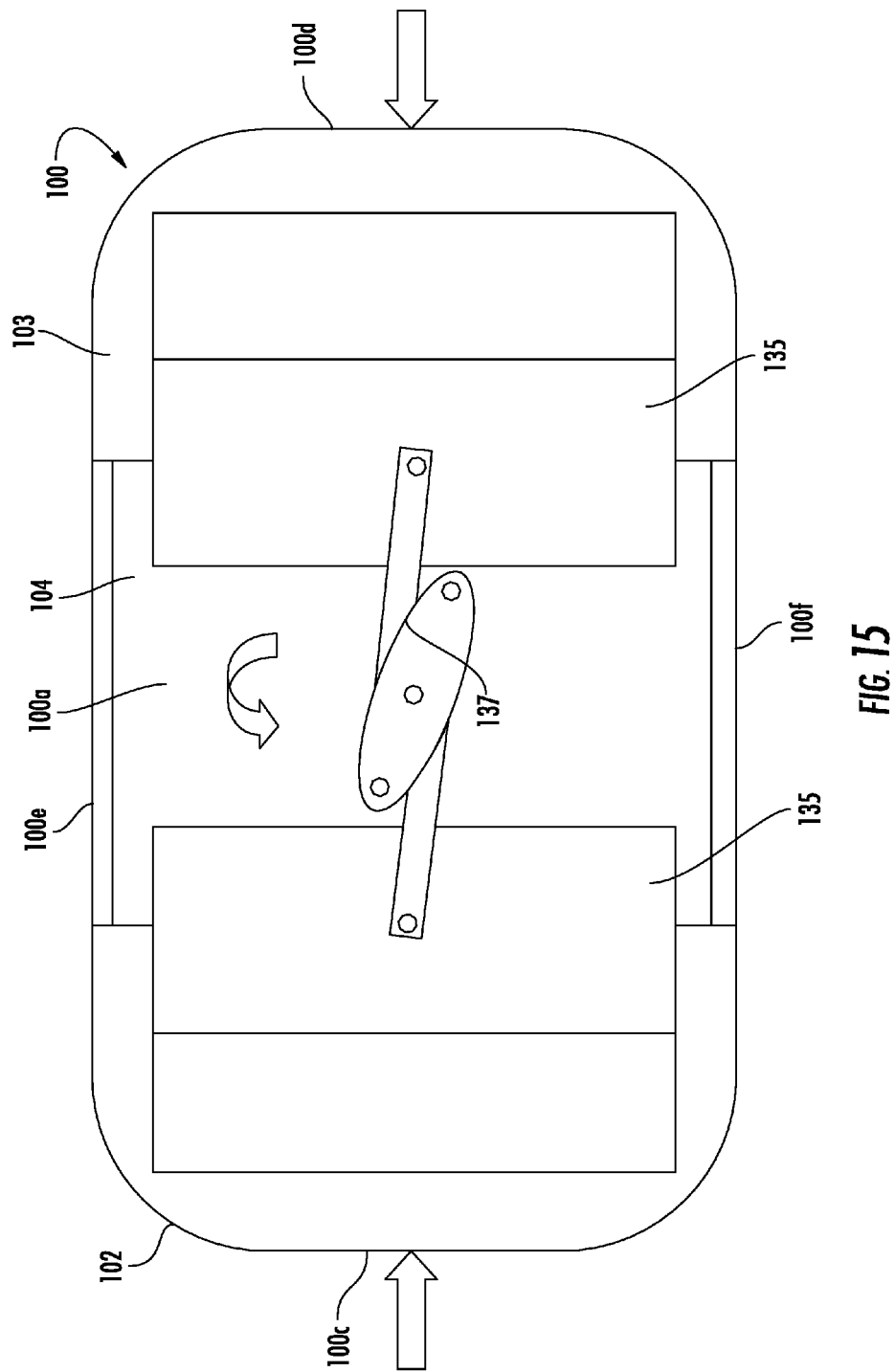
FIG. 15 shows a bottom of a portable paving mix container according to one embodiment with the doors open.
Figure 16:
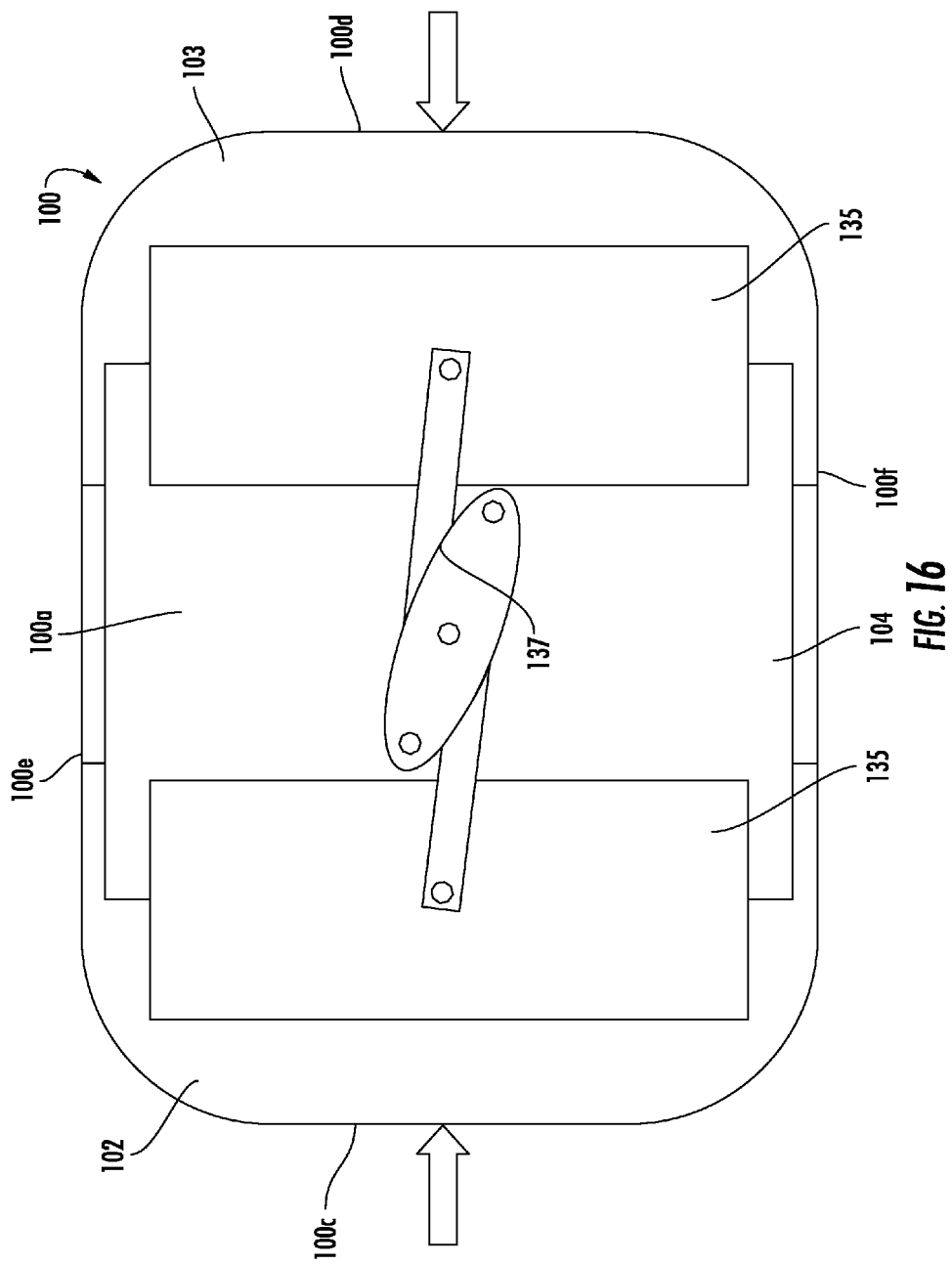
FIG. 16 shows a bottom of a portable paving mix container according to one embodiment in a collapsed position.

In the preferred embodiment, wherein the portable paving mix container 100 is utilized, the paving machine 10 opens at least one door 135, and preferably first and second doors 135, provided on the bottom 100*a* of the portable paving mix container 100 in order to release the paving mix. Those of ordinary skill in the art will appreciate that it is within the scope of the present invention to use a variety of mechanisms for purposes of opening the doors 135. By way of example, and not limitation, FIG. 7 illustrates one possible door opening mechanism 41, which may be provided above the mix unloading section 40. As shown in FIGS. 7 and 14-15, the door opening mechanism 41 may apply torque to a door control mechanism 137 connected to the doors 135 to cause the doors 135 to slidably open and the paving mix to be released. As the paving mix is released, a paving mix conveyor 42 within the mix unloading section 40 may transport the paving mix to the auger 12 and screed 13.

According to another aspect of the present embodiment, the mix unloading section 40 is configured to transport the portable paving mix container to the container offloading conveyor section 50. As shown in FIG. 4, the mix unloading section preferably includes a container conveyor 43 for transporting the container to the container offloading conveyor section 50. As shown the container conveyor 43 is preferably located above the paving mix conveyor 42. The container conveyor 43 may be a belt or chain drive similar to the belt or chain drive 32 provided on the container loading conveyor section 30 and may if desired include protrusions or depressions similar to the depressions and protrusions 33 provided on the container loading conveyor section 30. In addition to transporting the portable paving mix container to the container offloading conveyor section 50, those of ordinary skill in the art will appreciate that the container conveyor 43 may also assist in positioning the container in relation to the door opening mechanism 41 and the paving mix conveyor 42 during unloading of the paving mix from the portable paving mix container. While the present embodiment is shown with a belt or chain drive moving container conveyor 43, in an alternative embodiment the loading of subsequent portable paving mix container 100 may push an unloaded portable paving mix container off the mix unloading section 40 and towards the container offloading conveyor section 50.

Figure 8B:
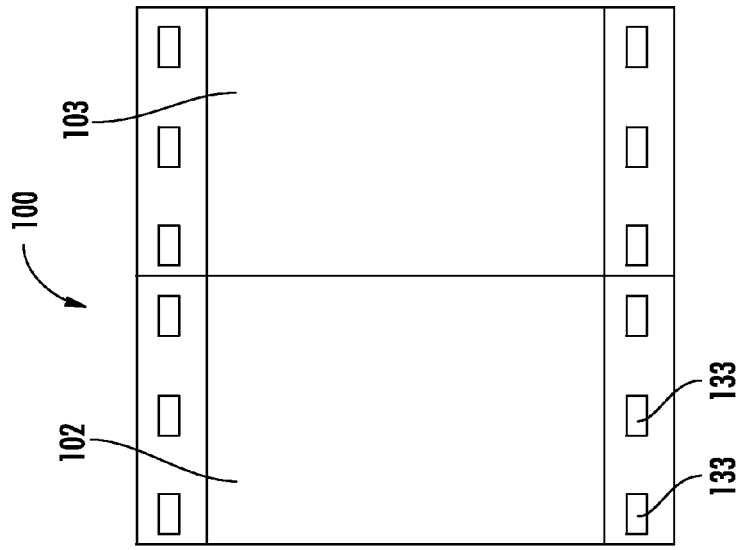
FIG. 8B shows a collapsible portable paving mix container according to one embodiment in a collapsed position.
Figure 8A:
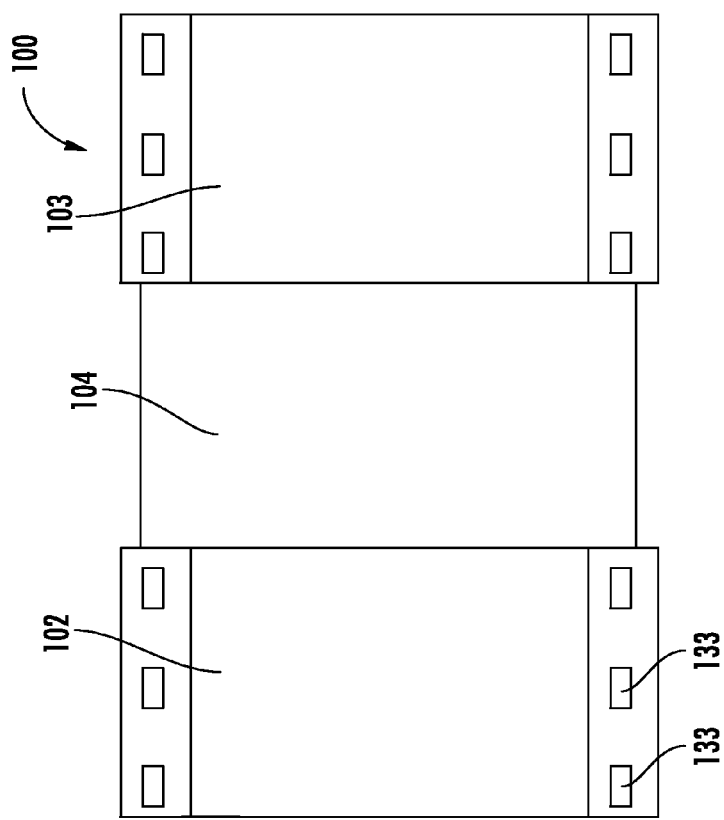
FIG. 8A shows a collapsible portable paving mix container according to one embodiment in an extended position.
Figure 9:
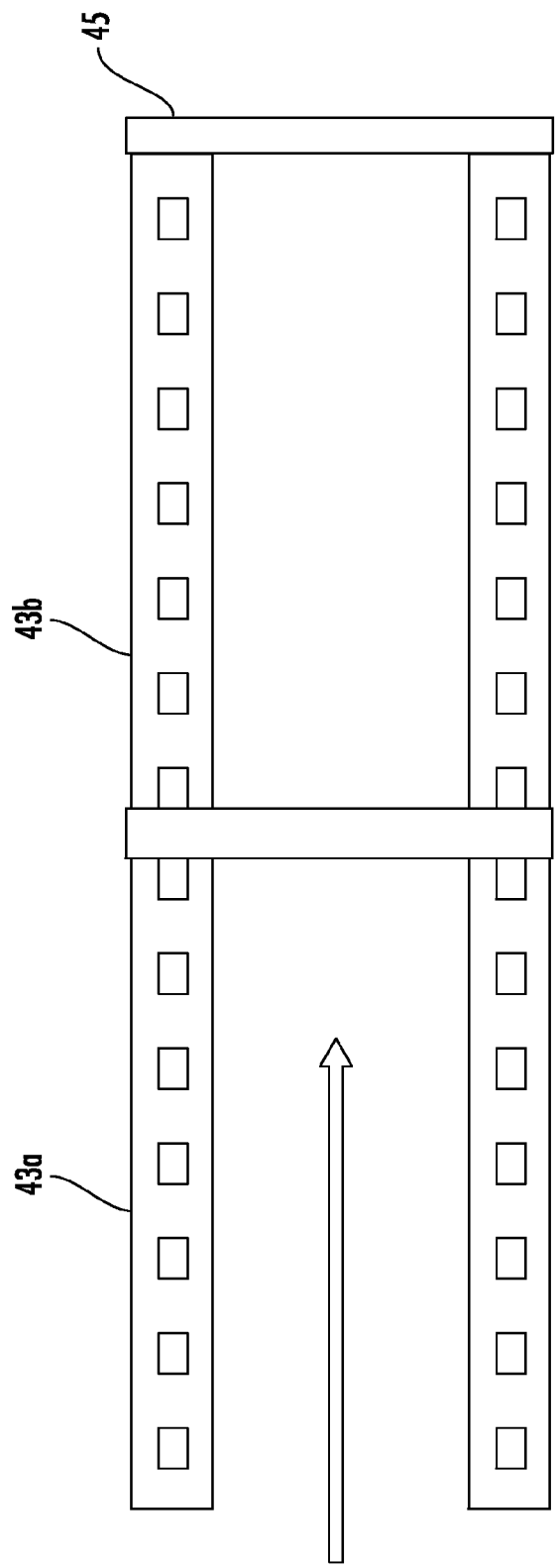
FIG. 9 shows a mix unloading section of one embodiment of the paving machine.

According to yet another aspect of the present embodiment, the mix unloading section 40 is configured to collapse the portable paving mix container. While the present invention contemplates using numerous collapsible container designs, in the presently preferred embodiment, the paving machine 10 is configured to collapse the portable paving mix container 100. As shown in FIGS. 8A and 8B, the portable paving mix container 100 includes two end caps 102, 103 and a center section 104 that are telescopically connected. As shown in FIG. 9, for purposes of collapsing the portable paving mix container, the container conveyor 43 may be provided with a first section 43*a* and a second section 43*b*. By operating the forward most first section 43*a* at a speed that is greater than the speed at which the subsequent second section 43*b* is operated, those of ordinary skill in the art will appreciate that the portable paving mix container 100 may transition from the portable paving mix container 100 from an expanded configuration as shown in FIG. 8A to a collapsed configuration as shown in FIG. 8B. Alternatively, as shown in FIG. 9, an elevated stop 45 may be provided at the rearward terminus of the mix unloading section 40. Those of ordinary skill in the art will appreciate that the stop 45 may be connected to an actuating mechanism that elevates the stop when it is desired to collapse the portable paving mix container 100 and that lowers the stop when it is desired to allow the collapsed portable paving mix container 100 to be transported to the container offloading conveyor section 50.

According to one aspect of the present embodiment, the paving machine 10 is configured so that the portable paving mix container 100 may be offloaded from the paving machine 10. The form of offloading the portable paving mix container from the paving machine 10 may take a variety of forms. In one arrangement, a vehicle, such as, for example, a fork lift or mini crane, may offload portable paving mix containers 100 from the paving machine 10 after the mix has been unloaded. In another arrangement the paving machine 10 may self offload the portable paving mix containers. By way of example, the paving machine may be outfitted with a mini crane or elevator.

In the preferred embodiment, the container offloading conveyor section 50 is configured to self offload the portable paving mix containers onto the paving machine. As shown, in FIGS. 4 and 10, when the container offloading conveyor section 50 is deployed it is preferably ramped so that it declines downwards to a ground surface. Similar to the container loading conveyor section 30, the container offloading conveyor section 50 may also include a belt or chain drive 32 that self offloads the portable paving mix container from the paving machine 10. Furthermore, similar to the belt or chain, drive 32 may if desired include a plurality of protrusions or depressions similar to the protrusions or depressions 33 that mate with respective protrusions or depressions 133 on a bottom 100*a* of the portable paving mix containers 100 during self offloading. Advantageously, once the portable paving mix containers 100 are offloaded, they may be retrieved by a vehicle, returned to a pavement plant, returned to the expanded configuration shown in FIG. 8A and reused as a portable paving mix container.

Turning now to FIGS. 8A, 8B, 13-18, the preferred portable paving mix container 100 is depicted. Although the present embodiment depicts one type of portable paving mix container 100, those of ordinary skill in the art will appreciate that it is within the scope of the present invention to utilize other types.

As shown, the portable paving mix container 100 preferably includes 6 walls 100*a*-100*f*, including a bottom 100*a*, top 100*b*, front 100*c*, rear 100*d*, and side walls 100*c* and 100*f*. As shown, die portable paving mix container is preferably provided with a generally rectangular box shape. Preferably, the portable paving mix container 100 is insulated to reduce thermal loss. By way of example, the portable paving mix container may be fabricated to include a material with high insulating properties. Additionally, as shown in FIG. 18, the portable paving mix container 100 may be double walled.

According to one aspect of the present embodiment, the portable paving mix container 100 is configured to be collapsible. As shown in FIGS. 8A and 8B, the portable paving mix container 100 includes two end caps 102, 103 and a center section 104 that are telescopically connected, whereby the portable paving mix container 100 may have an extended configuration as shown in FIG. 8A and a collapsed configuration as shown in FIG. 8B. In this example, the center section 104 is provided as an inner hollow rectangular tube that forms portions of the walls 100*a*, 100*b*, 100*c*, and 100*f*, and the two outer end caps 102, 103 that form portions of the bottom 100*a*, top 100*b*, side walls 100*c* and 100*f*, as well as the end front and rear walls 100*c*, 100*d*. As shown, center section 104 is an inner tube that fits inside the caps 102, 103, which are supported for sliding movement relative to the inner tube. In the collapsed or contracted state shown in FIG. 8B, the two caps 102, 103 are in an abutting relationship.

According to one aspect of the present embodiment, the portable paving mix container 100 is provided with at least one door 135, preferably located on the bottom 100a. As shown, the portable paving mix container 100 is preferably provided with first and second doors 135. The doors 135 are shown preferably located on the end caps 102, 103 of the portable paving mix container 100; however, in an alternative embodiment, one or more doors may be provided on the center section 104. As discussed, the paving machine 10 preferably opens the doors 135 to unload or release the paving mix into the mix unloading section 40. As shown in FIGS. 7 and 14-15, the portable paving mix container 100 preferably includes the door control mechanism 137 connected to the doors 135, which when turned through the application of torque cause the doors 135 to slidably open and the paving mix to be released from the portable paving mix container 100. Those of ordinary skill in the art will appreciate that the present embodiment depicts one example of doors and that other arrangements are within the scope of the present invention, including arrangements where the doors swing open rather than slidably open, as shown and arrangements wherein foe doors are opened separately.

Figure 18:
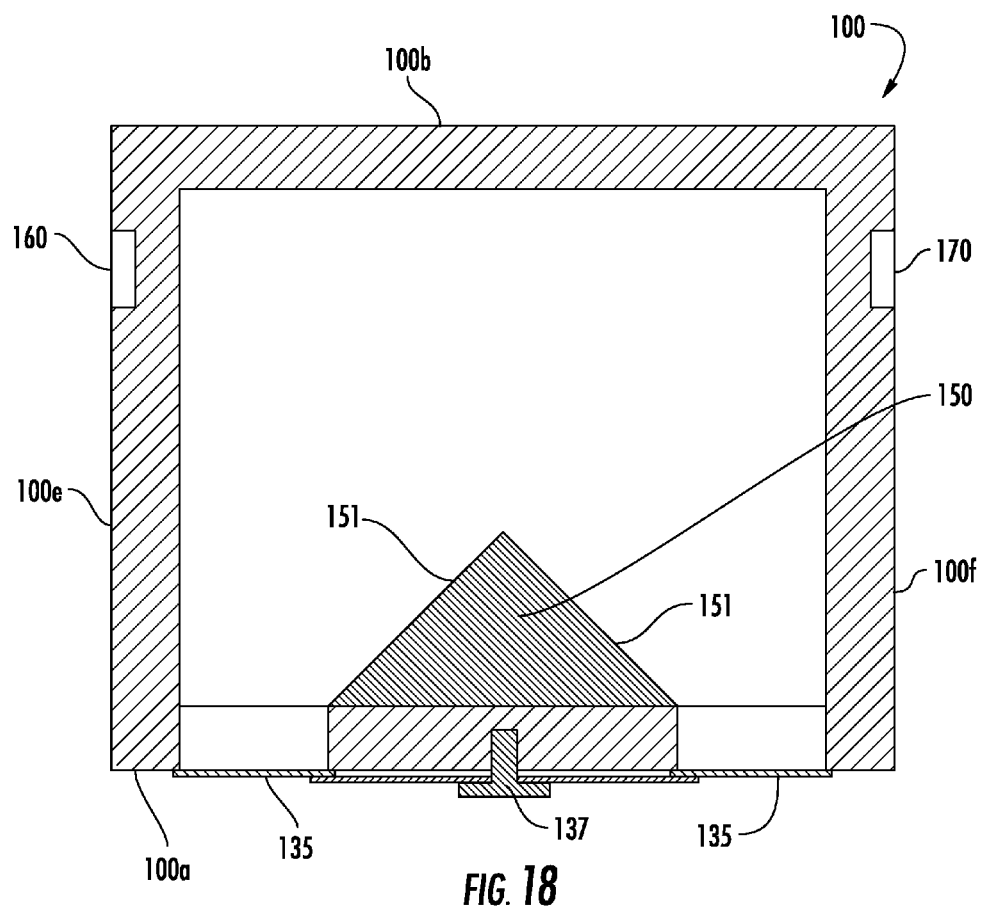
FIG. 18 shows an interior of a portable paving mix container according to one embodiment showing a paving mix diversion section of the portable paving mix container.

As shown in FIG. 18, an interior of a portable paving mix container 100 preferably includes a paving mix diversion section 150 that diverts paving material to the doors 135. As shown, the paving mix diversion section 150 may be located in the center section 104 of the portable paving mix containers 100 and positioned between the doors 135. As shown, the diversion section 150 preferably includes include sloped wails 151 that extend downward towards the doors 135.

Figure 12:
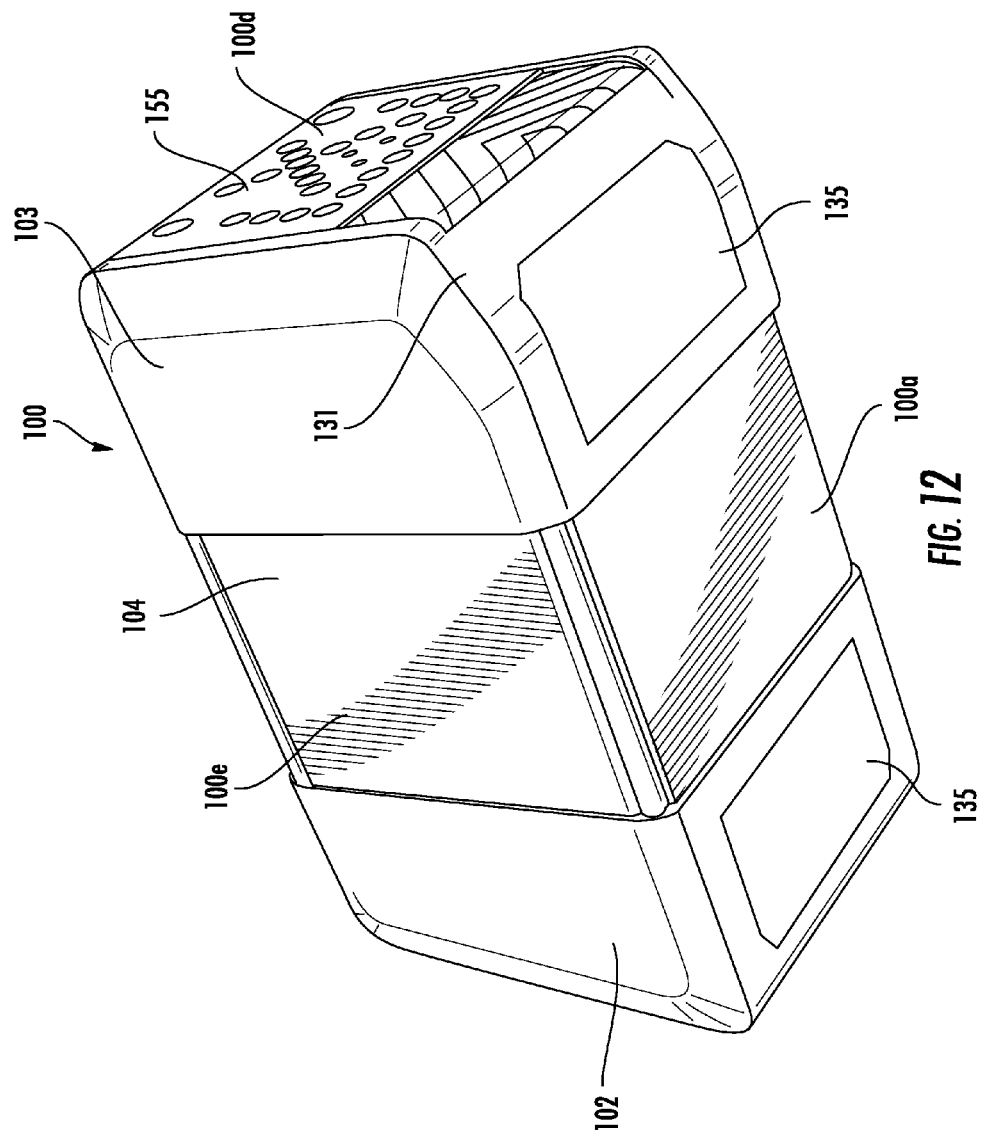
FIG. 12 shows a portable paving mix container according to one embodiment.

According to another aspect of the present embodiment, the portable paving mix container 100 is configured to be self loaded by foe paving machine 10. To assist in loading the portable paving mix container 100, as shown in FIG. 12, the bottom 100a of the portable paving mix container 100 may include a chamfer 131 positioned along the bottom 100c and rear 100d of portable paving mix container 100. The chamfer 131 aids the self loading of the portable paving mix container 100 onto the container loading conveyor section 30, which may be slid or positioned under the chamfered edge 131 and then the bottom 100a of the portable paving mix container.

Figure 17:
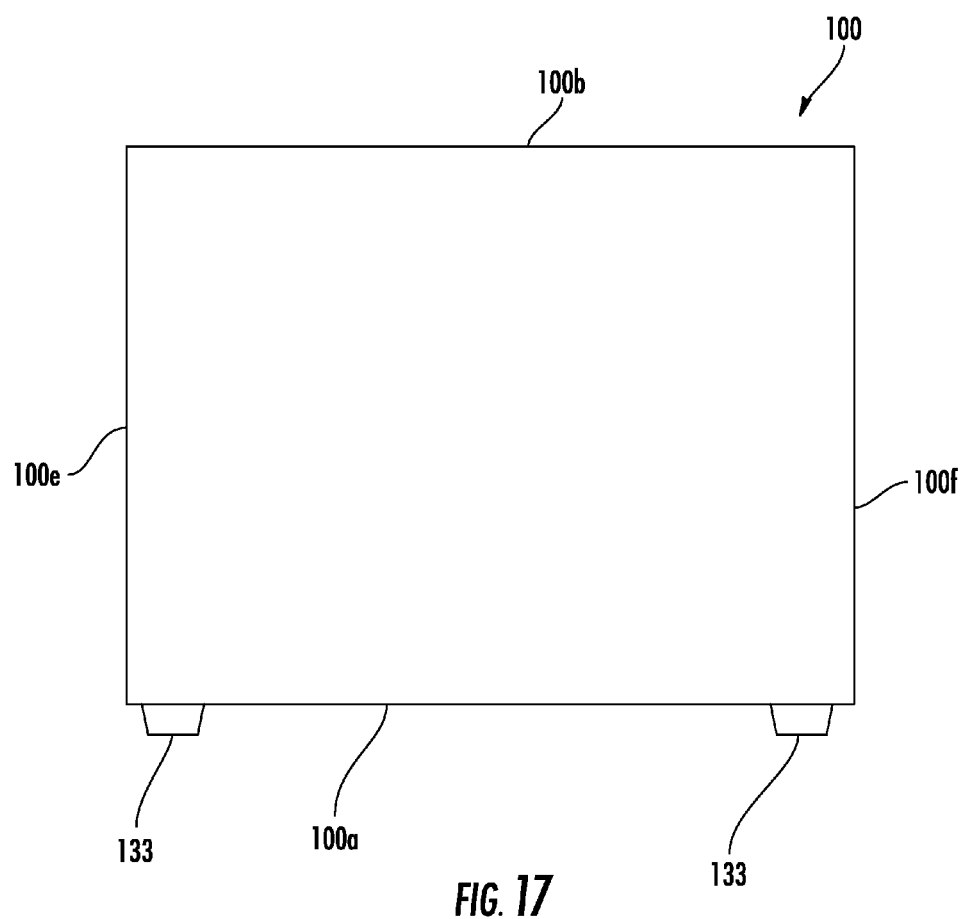
FIG. 17 shows a front or rear of the portable paving mix container according to one embodiment provided with protrusions on the bottom.

As shown in FIGS. 8A, 8B, and 17, the bottom 100e of the portable paving mix container may also include a plurality of protrusions or depressions 133 that mate with the respective depressions or protrusions 33 on the belt or chain drive 32 of the container loading conveyor section 30 during self loading. As shown, plurality of protrusions or depressions 133 may extend linearly along opposing edges of the bottom 100a and in the case of protrusions support the collapsible portable paving mix container. In a preferred arrangement foe plurality of protrusions 133 would be recessed or flush relative to below the center section 104, which may function as the primary support surface in order to evenly distribute the weight of the portable paving mix container 100 and its contents. However, those of ordinary skill in the art will appreciate that it in embodiments wherein the protrusions 133 are flush that the protrusions 133 may function to partially support the portable paving, mix container 100 and its contents as well.

Figure 13:
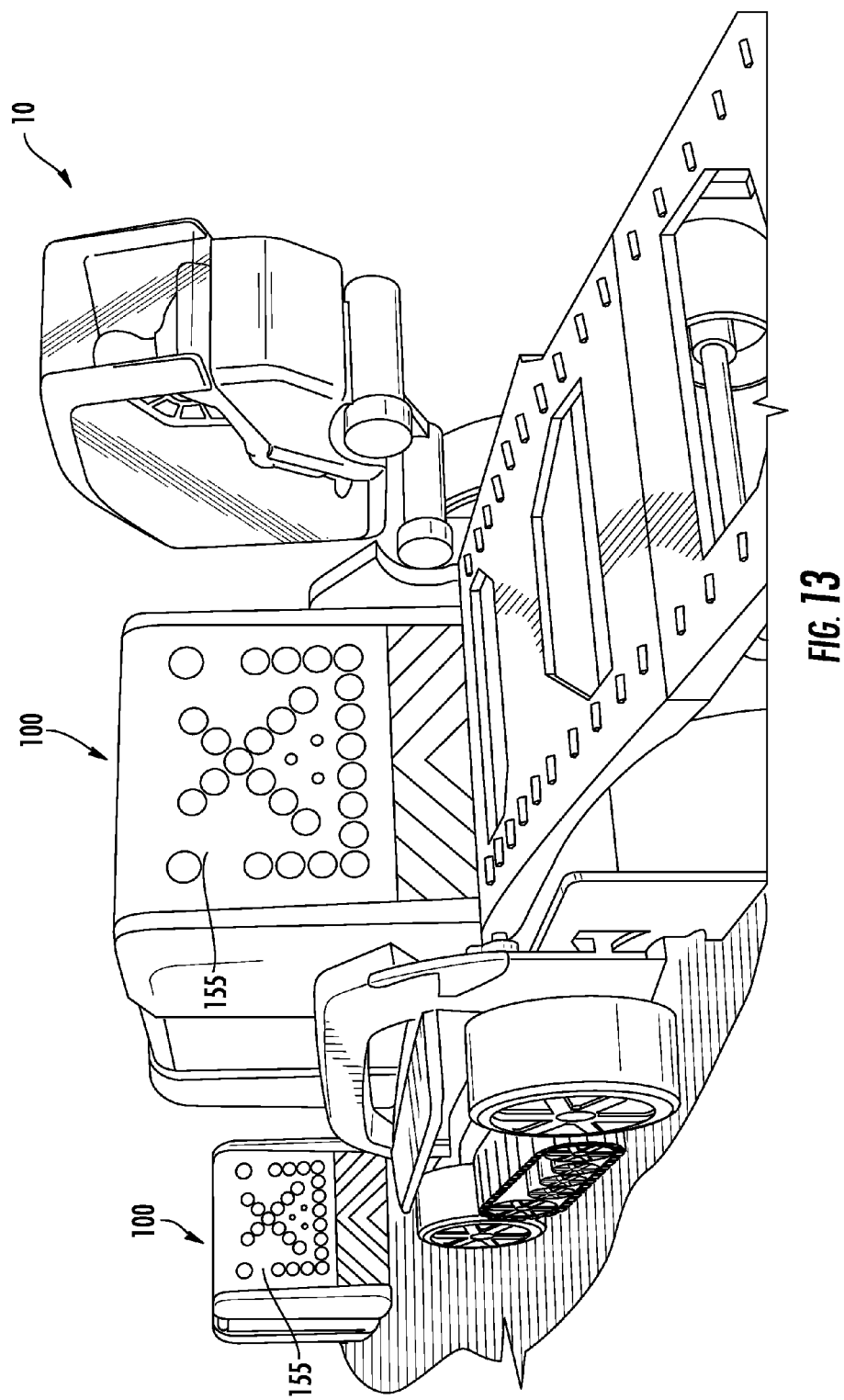
FIG. 13 shows a rear view of the paving machine unloading mix from a portable paving mix container and illustrates the traffic control features of the portable paving mix container.

Turning now to FIG. 13, the exterior surface of the portable paving mix container 100 may be provided with traffic control signals 150. As shown, the traffic control signals 155 are preferably located on the rearward side of the portable paving mix container 100. The traffic control signals 155 are preferably in the form of a programmable electronic display as shown, but may also, within the scope of the present invention, be any type of graphical signal, including one that is magnetically affixed or otherwise temporarily affixed to the portable paving mix container 100.

As shown in FIG. 18, the portable paving mix container 100 may also include a radio frequency identification chip 160 and/or a gps tracking device 170 to assist in precise positioning and tracking of the location, and condition, for example, filled with paving material, emptied of paving mix, collapsed condition, expanded condition, of portable paving mix container 100.

Advantageously, the preferred portable paving mix container 100 construction provides the benefit of a space-saving collapsible design and an integrated traffic control system alleviating the need for additional costly equipment. Additionally, embedded RFID tags in each portable paving mix container 100 facilitate process control through proper positioning of full portable paving mix containers 100 and providing traceability of the entire lay-down operation. The mix inside the preferred portable paving mix container 100 is thus fully 'six wall contained' and is thereby thermally insulated so that only negligible heat loss occurs during the transport and staging operation prior to use. In addition, and where thermal loss is not a concern, the apparatus offers significant value in its ability to prevent mechanical segregation during transportation and delivery of the mix to the paving machine 10. The bottom 100a includes discharge doors 135 which are opened when the preferred portable paving mix container 100 is positioned at the hopper/conveyor 43 of the mix unloading section 40. The preferred portable paving mix container bottom 100a, top 100b, and side walls 100c and 100f are designed to extend in a telescoping manner to expand to accept a full mix load and collapse or contract when emptied to facilitate recovery.

During a paving operation, the paving machine 10 is configured with the forward and rear ramped conveyor sections 30, 50 in the deployed positions 30b, 50b and the tracks 20 deployed. The loaded portable paving mix containers 100 are delivered to the paving location and arrayed to be picked up the paving machine 10. According to the preferred embodiment, portable paving mix containers 100 may be delivered and positioned in conjunction with a GPS-coordinated placement strategy, which will allow the lay-down process to be conducted in a non-stop fashion resulting in no need for concern about mat imperfections resulting from idle screed settling. Advantageously a plurality of the portable paving mix containers 100 may be placed on a paving surface at spaced intervals, wherein the spaced intervals are dimensioned according to an amount of pavement formed by the paving mix of the portable paving mix containers 100a. Advantageously, in a preferred arrangement, the spaced intervals may be dimensioned to precisely correspond to an amount pavement formed by the paving mix of the portable paving mix containers 100.

After the portable paving mix containers 100 are placed along the paving surface, the paving machine picks up a loaded portable paving mix container 100 on the front ramped conveyor section 30 and moves it to the container conveyor 43 of the mix unloading section 40, where the mix is discharged from the portable paving mix container 100. The doors 125 may be opened simultaneously or the leading discharge door 135 may be opened first and then as the portable paving mix container 100 moves fully onto the container conveyor 43, the other door 135 may open.

As the portable paving mix container 100 completes unloading, the paving machine 10 causes the portable paving mix containers 100 to compress to the collapsed state shown in FIG. 8B. Simultaneously, another portable paving mix container 100 may be picked up by the front loading conveyor section 30, and moved to mix unloading section 40 whereat the paving mix is unloaded.

When the first portable paving mix container 100 is empty and the paving machine 10 completes the contraction/collapse operation, the conveyor section 43 moves the collapsed portable paving mix container 100 to the rear ramped conveyor section 50 to be unloaded from the machine for recovery and re-use. As the second portable paving mix container 100 continues to discharge its load at the hopper/conveyor 43 and is collapsed, a third POD may be picked up by the front ramped conveyor section 30 and moved into position to discharge its mix load.

The ability to continuously unload mix from the portable paving mix containers 100 combined with a high conveyor/hopper 43 capacity may in a preferred arrangement facilitate non-stop or continuous paving operation. A wide slat conveyor 43 may move the paving mix from the hopper into the auger chamber. Variable pitch and speed radial flights then may be provided on the auger 12 to extend the mix laterally to the selected paving width, just ahead of the high-density screed 13, which may also be width adjustable.

The operator may monitor and controls all paving functions from the control interface 25. The paving machine 10 may collect data from all operating systems for real-time local or remote process control. The paving machine 10 may use this information to communicate in real time with the paving mix plant and any container 100 delivery vehicles, which transport the containers 100 from the plant to the jobsite. The control interface 25 may include a heads up display that shows operating parameters including forward speed, paving width, lay down thickness and more.

Figure 19:
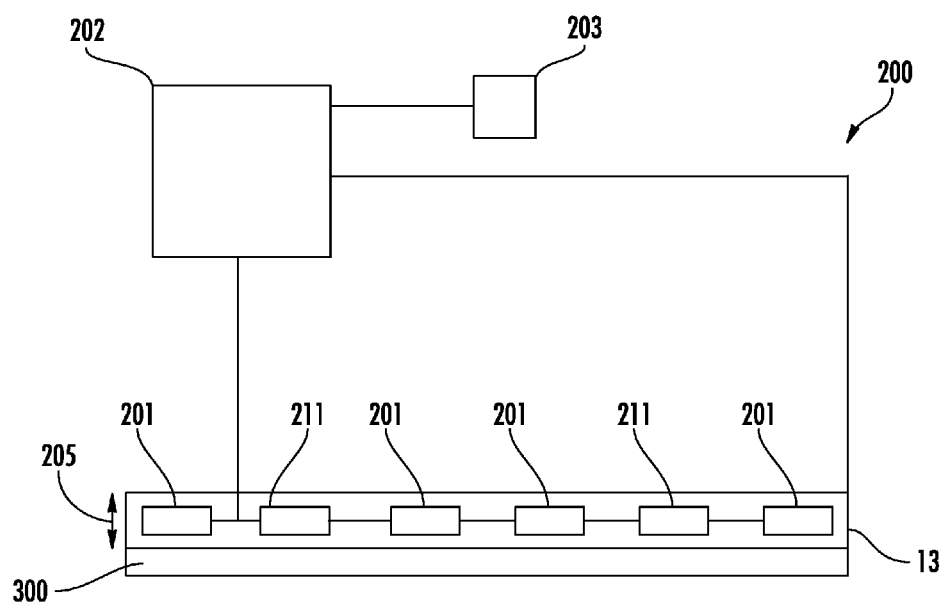
FIG. 19 shows one embodiment of a feedback loop for monitoring pavement bearing capacity.

Turning now to FIG. 19 a feedback loop 200 according to one embodiment is shown. As shown therein, pavement relative density readings may be monitored by appropriate sensors 201. This stiffness measure or density readings may be obtained using multiple measuring technologies, including, but not limited to, accelerometers, nuclear densitometers, and/or non-nuclear electrical impedance monitors. These readings may be taken across the full pavement 300 width. The readings may be displayed, stored, transmitted, and used as part of a feedback loop 200 for making real time changes to the variable tamping screed, i.e. to adjust the pressure or force exerted by the screed 13 on the pavement 300 in order to achieve a desired pavement density. By way of example and not limitation, one or more electronics 202 may be provided that receive output signals from the sensors 201 and which automatically adjust the force 205 exerted by the screed 13 on the pavement 300. Alternatively or additionally, the density readings may be shown on a display 203 and the operator may snake manual adjustments.

In addition to an extendable augers 12 for uniform distribution ahead of the high-density screed 13, as shown in FIGS. 20A and 20B, the screed 13 may be provided with multiple sections, including the center main screed 13a with primary and secondary extensions 13b and 13c on both left and right sides of the main screed 13a. The main screed section and all four extensions are fitted with high-density tampers 15 in their leading sections, and also incorporate high-frequency vibrators 16 in their trailing sections. The tampers function to provide effective air void removal from the deeper portion of the pavement section being placed; the vibrators are specialized for efficient removal of voids nearer the pavement surface and also assist with maximizing surface smoothness characteristics. The main screed 13a may be capable of being adjusted to provide either positive or negative crown to the pavement 300 surface and is infinitely adjustable for angle of attack. Each extension 13b, 13c is individually adjusted for slope as well as for angle of attack. The one or more electronics 202 or operator may adjust stroke of the tampers 15 and frequency of the vibrators 16 in accordance with measurements of pavement 300 stiffness recorded under the main screed 13a and under each separate extension 13b and 13c.

In addition to the stiffness and/or density sensors 201, additional sensors 211, including, but not limited to, infrared and microwave sensors may continuously monitor pavement 300 surface and pavement 300 core temperatures; this data may be stored on the one or snore electronics 202 along with the stiffness and/or density data for documentation of the paving process. Centimeter-level accuracy of die locations of the data is achieved may be tacked using a machine-based global positioning system receiver that is tied to another GPS receiver positioned adjacent to the construction activity. Operation of the paving machine 10 may be semi-automatic once the initial adjustments have been performed. The one or more electronics 202 adjusts the paver guidance system, its grade and slope, the stroke of tampers and the frequency of the vibrators housed inside the main screed 13 and any screed extensions in a manner whereby manual intervention may not be required and whereby subsequent finishing by a roller may not be required to achieve proper compaction.

Advantageously, the preferred aspects of the paving machine 10 maximizes yield without sacrificing quality and greatly improves jobsite safety. Through the use of this methodology, the work zone is greatly reduced in size thereby reducing traffic disruption and promoting safety. The portable paving mix containers 100 may be equipped with traffic control signals 155 on the end wails 100c, 100d, which may include a lighted arrow system to indicate a safe passing direction for following traffic and hazard markings.

Because the unit is fully OTR capable, no longer is there a need for permitting oversized/over weight equipment. The use of continuous portable paving mix containers 100 entry, process, and discharge promotes continuous operation and thereby eliminating mat imperfections such as screed settling and 'truck bumps'. With the preferred design of the paving machine 10, the machine and process may be all 'single man controlled' unlike today's methods which require multiple operator's ranging from paver operator, screed men, dump man, MTV operator, equipment haul vehicle operator, etc.

Furthermore, while it is within scope of the present embodiment for the paving machine 10 to be powered via a conventional diesel or gasoline engine, the paving machine 10 may incorporate many "green" technologies. By way of example, power may be provided by integrated fuel cells or hybrid electric technology. Use of fuel cells in particular may eliminate noise and emissions or fumes from the entire paving process. Additionally, the paving mix may be quick curing and include an organic binder. Furthermore, the use of reusable portable paving mix containers 100 also permits large scale recycling.

The detailed descriptions of the above embodiments are not exhaustive descriptions of all embodiments contemplated by the inventors to be within the scope of the invention. Persons skilled in the art will recognize that certain elements of the above-described embodiments may variously be combined or eliminated to create further embodiments, and such further embodiments fell within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize.

Furthermore, those of ordinary skill in the art will appreciate that while various preferred aspects of the invention have been disclosed, that the present invention is not so limited. Rather, the scope of the invention is determined from the appended claims and equivalents thereof.

We claim:

1. An integrated paving system, comprising:
   a portable paving mix container containing a paving mix for forming pavement;
   a paving machine, wherein:
      the portable paving mix container is loaded onto the paving machine;
      the paving machine unloads the paving mix from the portable paving mix container; and
      the paving machine distributes and compacts the paving mix on a paving surface.

2. The integrated paving system according to claim 1, wherein the paving machine opens at least one door on the portable paving mix container in order to unload the paving mix from the container.

3. The integrated paving system according to claim 1, wherein the paving machine further comprises:
   one or more conveyor sections that receive the portable paving mix container as the portable paving mix container is loaded onto the paving machine and that unload the portable paving mix container off the paving machine; and
   a mix unloading section whereat paving mix from the portable container is unloaded.

4. The integrated paving system according to claim 3, wherein the one or more conveyor sections include:
   a container loading conveyor section that receives the portable paving mix container as it is loaded onto the paving machine; and
   a container offloading conveyor section that offloads the portable paving mix container from the paving machine.

5. The integrated paving system according to claim 3, wherein:
   the one or more conveyor sections include:
      a container loading conveyor section that receives the portable paving mix container as it is loaded onto the paving machine;
      a container offloading conveyor section that offloads the portable paving mix container from the paving machine; and
   the mix unloading section is located between the container loading conveyor section and the container offloading conveyor section.

6. The integrated paving system according to claim 3, wherein:
   the one or more conveyor sections include:
      a container loading conveyor section that receives the portable paving mix container as it is loaded onto the paving machine;
      a container offloading conveyor section that offloads the portable paving mix container from the paving machine;
   the mix unloading section is located between the container loading conveyor section and the container offloading conveyor section;
   the container loading conveyor section transports the portable paving mix container to the mix unloading section; and
   the mix unloading section transports the portable paving mix container to the container off loading section.

7. The integrated paving system according to claim 1, wherein the paving machine includes a first drive arrangement that includes road wheels for self transport at highway speeds and a second drive arrangement that includes a track assembly for jobsite transportation during a paving operation.

8. The integrated paving system according to claim 1, wherein the paving machine includes:
   an auger for distributing the mix on a paving surface;
   a screed for compacting the mix on a paving surface;
   a first drive arrangement that includes road wheels for self transport at highway speeds;
   a second drive arrangement that includes a track assembly for jobsite transportation during a paving operation; and
   the track assembly, screed, and auger are lowered to place the track assembly in contact with a ground surface and to position the screed and auger at a proper height for a paving operation.

9. The integrated paving system according to claim 1, wherein the paving machine includes:
   an auger for distributing the mix on a paving surface;
   a screed for compacting the mix on a paving surface;
   a first drive arrangement that includes road wheels for self transport at highway speeds;
   a second drive arrangement that includes a track assembly for jobsite transportation during a paving operation; and
   the track assembly, the screed, and the auger are simultaneously lowered into position to place the track assembly in contact with a ground surface and to position the screed and auger at a proper height for a paving operation.

10. The integrated paving system according to claim 1, wherein the paving machine self loads the portable paving mix container onto the paving machine.

11. The integrated paving system according to claim 1, wherein the paving machine self offloads the portable paving mix container from the paving machine.

12. The integrated paving system according to claim 3, wherein the one or more conveyor sections self loads the portable paving mix container onto the paving machine.

13. The integrated paving system according to claim 3, wherein the one or more conveyor sections includes a belt or chain drive that self loads the portable paving mix container onto the paving machine.

14. The integrated paving system according to claim 3, wherein the one or more conveyor sections includes a belt or chain drive that self offloads the portable paving mix container from the paving machine.

15. The integrated paving system according to claim 4, wherein the container loading conveyor section is ramped so that it inclines upwards from a ground surface and is positionable under the portable paving mix container for self loading the portable paving mix container onto the paving machine.

16. The integrated paving system according to claim 4, wherein the container offloading conveyor section is ramped so that it declines downward from the paving machine to a ground surface and self unloads the portable paving mix container from the paving machine.

17. The integrated paving system according to claim 1, wherein one or more doors are provided on a bottom of the portable paving mix container, wherein the one or more doors are opened to unload the mix.

18. The integrated paving system according to claim 1, wherein the portable paving mix container is provided with a collapsed configuration and an expanded configuration.

19. The integrated paving system according to claim 1, further comprising a plurality of portable paving mix containers located on the paving surface at spaced intervals, wherein the spaced intervals are dimensioned according to an amount of pavement formed by the paving mix of the plurality of portable paving mix containers.

20. The integrated paving system according to claim 1, further comprising a plurality of portable paving mix containers provided with radio frequency identification chips, wherein said plurality of portable paving mix containers are located on the paving surface at spaced intervals dimensioned according to an amount of pavement formed by the paving mix of the plurality of portable paving mix containers.

21. The integrated paving system according to claim 1, further comprising a plurality of portable paving mix containers provided with gps tracking devices, wherein said plurality of portable paving mix containers are located on the paving surface at spaced intervals dimensioned according to an amount of pavement formed by the paving mix of the plurality of portable paving mix containers.

22. The integrated paving system according to claim 1, further comprising another portable paving mix container wherein the paving machine is loaded with the portable paving mix container and the another portable paving mix container simultaneously.

23. The integrated paving system according to claim 4, further comprising another portable paving mix container wherein the portable paving mix container is located on the container loading conveyor section and the another portable paving mix container is located on the mix unloading section.

24. A method for forming a pavement, comprising the steps of:
providing a portable paving mix container containing a paving mix for forming pavement;
loading the portable paving mix container onto a container loading conveyor section of a paving machine, wherein the container loading conveyor section receives the portable paving mix container as it is loaded onto the paving machine;
unloading the paving mix from the portable paving mix container into a mix unloading section of the paving machine;
offloading the portable paving mix container from an offloading conveyor section of the paving machine; and
using the paving machine to distribute and compact the paving mix on a paving surface.

25. The method for forming a pavement according to claim 24, wherein the step of unloading the paving mix from the portable paving mix container includes the step of using the paving machine to open at least one door on the portable paving mix container in order to release the paving mix from the container.

26. The method for forming a pavement according to claim 24, wherein:
the mix unloading section is located between the container loading conveyor section and the container offloading conveyor section.

27. The method for forming a pavement according to claim 24, wherein:
the mix unloading section is located between the container loading conveyor section and the container offloading conveyor section and includes a conveyor;
the method further comprising the steps of:
using the container loading conveyor section to transport the portable paving mix container to the mix unloading section; and
using the conveyor of the mix unloading section to transport the portable paving mix container to the container off loading section.

28. The method for forming a pavement according to claim 24, further comprising the step of using a first drive arrangement that includes road wheels for self transport of the paving machine at highway speeds and a second drive arrangement that includes a track assembly for jobsite transportation of the paving machine during a paving operation.

29. The method for forming a pavement according to claim 24, wherein the paving machine includes:
an auger for distributing the mix on a paving surface;
a screed for compacting the mix on a paving surface;
a first drive arrangement that includes road wheels for self transport at highway speeds;
a second drive arrangement that includes a track assembly for jobsite transportation during a paving operation; and
the method further comprising the step of:
subsequent to self transport at highway speeds, lowering the track assembly, screed, and auger to place the track assembly in contact with a ground surface and to position the screed and auger at a proper height for a paving operation.

30. The method for forming a pavement according to claim 24, wherein the paving machine includes:
an auger for distributing the mix on a paving surface;
a screed for compacting the mix on a paving surface;
a first drive arrangement that includes road wheels for self transport at highway speeds;
a second drive arrangement that includes a track assembly for jobsite transportation during a paving operation; and
the method further comprising the step of:
subsequent to self transport at highway speeds simultaneously lowering the track assembly, the screed, and the auger to place the track assembly in contact with a ground surface and to position the screed and auger at a proper height for a paving operation.

31. The method for forming a pavement according to claim 24, wherein the step of loading the portable paving mix container onto the container loading conveyor section of the paving machine comprises the step of using the container loading conveyor section of the paving machine to self load the portable paving mix container onto the paving machine.

32. The method for forming a pavement according to claim 24, wherein the step of offloading the portable paving mix container from the offloading conveyor section of the paving machine comprises the step of using the offloading conveyor section of the paving machine to self offload the portable paving mix container from the paving machine.

33. The method for forming a pavement according to claim 24, wherein:
the offloading conveyor section includes a belt or chain drive; and
the step of offloading the portable paving mix container from an offloading conveyor section of the paving machine includes the step of using the belt or chain drive of the offloading conveyor section to self offload the portable paving mix container from the paving machine.

34. The method for forming a pavement according to claim 24, wherein:
the container loading conveyor section includes a belt or chain drive; and
the step of loading the portable paving mix container onto the container loading conveyor section of the paving machine comprises the step of using the belt or chain drive of the container loading conveyor section to self load the portable paving mix container onto the paving machine.

35. The method for forming a pavement according to claim 24, wherein the mix unloading section includes a belt or chain drive that transports the portable paving mix container to the offloading conveyor section of the paving machine.

36. The method for forming a pavement according to claim 24, wherein:
the container loading conveyor section is ramped so that it inclines upwards from a ground surface; and
the step of loading the portable paving mix container onto the container loading conveyor section of the paving machine comprises the step of positioning the container loading conveyor section under the portable paving mix container and using the container loading conveyor section to self load the portable paving mix container onto the paving machine.

37. The method for forming a pavement according to claim 24, wherein:
the container offloading conveyor section is ramped so that it declines downward from the paving machine to a ground surface; and
the step of offloading the portable paving mix container from the offloading conveyor section of the paving machine comprises the step of using the container offloading conveyor section to self offload the portable paving mix container from the paving machine.

38. The method for forming a pavement according to claim 24, wherein:
one or more doors are provided on a bottom of the portable paving mix container; and
the step of unloading the paving mix from the portable paving mix container includes the step of using the paving machine to open the one or more doors in order to release the paving mix from the container.

39. The method for forming a pavement according to claim 24, wherein:
the portable paving mix container is provided with a collapsed configuration and an expanded configuration; and
further comprising the step of using the paving machine to collapse the portable paving mix container.

40. The method for forming a pavement according to claim 24, further comprising the step of placing a plurality of the portable paving mix containers on the paving surface at spaced intervals, wherein the spaced intervals are dimensioned according to an amount of pavement formed by the paving mix of the portable paving mix containers.

41. The method for forming a pavement according to claim 24, wherein a plurality of the portable paving mix containers are provided, the plurality of portable paving mix containers including radio frequency identification chips and further comprising the step of:
using the radio frequency identification chips to place the plurality of the portable paving mix containers on the paving surface at spaced intervals, wherein the spaced intervals are dimensioned to correspond to an amount pavement formed by the paving mix of the plurality portable paving mix containers.

42. The method for forming a pavement according to claim 24, wherein a plurality of the portable paving mix containers are provided, the plurality of portable paving mix containers including gps tracking devices and further comprising the step of:
using the gps tracking devices to place the plurality of the portable paving mix containers on the paving surface at spaced intervals, wherein the spaced intervals are dimensioned to correspond to an amount pavement.

43. The method for forming a pavement according to claim 24, further comprising the step of loading the paving machine with the portable paving mix container and the another portable paving mix container simultaneously.

44. The method for forming a pavement according to claim 24, wherein the step of loading the portable paving mix container onto the container loading conveyor section of the paving machine includes the step of loading the portable paving mix container on the container loading conveyor section while another portable paving mix container is located on the mix unloading section.

45. The method for forming a pavement according to claim 24, wherein the step of unloading the paving mix from the portable paving mix container into a mix unloading section of the paving machine includes the step of using the paving machine to unload the paving mix from the portable paving mix container.

46. The method for forming a pavement according to claim 24, further comprising the step of placing a plurality of the portable paving mix containers on the paving surface at spaced intervals, wherein the spaced intervals are dimensioned according to an amount of pavement formed by the paving mix of the portable paving mix containers and wherein:
the step of loading the portable paving mix container onto the container loading conveyor section of the paving machine includes the step of using the paving machine to self load the portable paving mix containers onto the container loading conveyor section of the paving machine; and
the step of offloading the portable paving mix container from the offloading conveyor section of the paving machine includes the step of using the paving machine to self offload the portable paving mix containers from the offloading conveyor section of the paving machine.

47. The method for forming a pavement according to claim 24, further comprising the step of placing a plurality of the portable paving mix containers on the paving surface at spaced intervals, wherein the spaced intervals are dimensioned to correspond to an amount pavement formed by the paving mix of the portable paving mix containers and wherein:
the step of loading the portable paving mix container onto the container loading conveyor section of the paving machine includes the step of using the paving machine to self load the portable paving mix containers onto the container loading conveyor section of the paving machine; and
the step of offloading the portable paving mix container from the offloading conveyor section of the paving machine includes the step of using the paving machine to self offload the portable paving mix containers from the offloading conveyor section of the paving machine.

48. The method for forming a pavement according to claim 24, wherein the container loading conveyor section is provided with a plurality of protrusions or depressions and a plurality of portable paving mix containers are provided, the plurality of portable paving mix containers including a plurality of protrusions or depressions located on a bottom of the plurality of portable paving mix containers, the method further comprising the step of:
mating the plurality of protrusions or depressions on the container loading conveyor section with the plurality of respective depressions or protrusions on the bottom of the plurality of portable paving mix containers for purposes of self loading the portable paving mix containers onto the paving machine.

49. The method for forming a pavement according to claim 24, wherein the container loading conveyor section is provided with a plurality of protrusions or depressions and a plurality of portable paving mix containers are provided, which include a plurality of protrusions or depressions located on a bottom of the plurality of portable paving mix containers, the method further comprising the steps of:

placing the plurality of the portable paving mix containers on the paving surface at spaced intervals, wherein the spaced intervals are dimensioned to correspond to an amount of pavement formed by the paving mix of the portable paving mix containers; and mating the plurality of protrusions or depressions on the container loading conveyor section with the plurality of respective depressions or protrusions on the bottom of the plurality of portable paving mix containers for purposes of self loading the portable paving mix containers onto the paving machine.

50. A method for forming a pavement, comprising the steps of:

providing a portable paving mix container containing a paving mix for forming pavement;

using a paving machine to self load the portable paving mix container onto a paving machine;

unloading the paving mix from the portable paving mix container into a mix unloading section of the paving machine;

offloading the portable paving mix container from the paving machine; and using the paving machine to distribute and compact the paving mix on a paving surface.

51. A method for forming a pavement, comprising the steps of:

providing a portable paving mix container containing a paving mix for forming pavement;

loading the portable paving mix container onto a paving machine;

unloading the paving mix from the portable paving mix container into a mix unloading section of the paving machine;

using the paving machine to self offload the portable paving mix container from the paving machine; and using the paving machine to distribute and compact the paving mix on a paving surface.

52. A method for forming a pavement, comprising the steps of:

providing a plurality of portable paving mix containers containing a paving mix for forming pavement;

placing the portable paving mix containers on the paving surface at spaced intervals, wherein the spaced intervals are dimensioned according to an amount of pavement formed by the paving mix of the portable paving mix containers loading the portable paving mix containers onto a paving machine;

unloading the paving mix from the portable paving mix containers into a mix unloading section of the paving machine;

offloading the portable paving mix containers from the paving machine; and using the paving machine to distribute and compact the paving mix on a paving surface.

53. A method for forming a pavement, comprising the steps of:

providing a portable paving mix container containing a paving mix for forming pavement;

providing another portable paving mix container containing a paving mix for forming pavement;

loading a paving machine with the portable paving mix container and the another portable paving mix container simultaneously;

unloading the paving mix from the portable paving mix containers into a mix unloading section of the paving machine;

offloading the portable paving mix containers from the paving machine; and using the paving machine to distribute and compact the paving mix on a paving surface.

* * * * *